(12) United States Patent
Melland

(10) Patent No.: US 11,312,533 B2
(45) Date of Patent: *Apr. 26, 2022

(54) STRUCTURAL ELEMENT

(71) Applicant: Gridesic Holdings Limited, Hong Kong (CN)

(72) Inventor: Tristan Melland, Cape Town (ZA)

(73) Assignee: Gridesic Holdings Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,939

(22) Filed: Jul. 12, 2019

(65) Prior Publication Data

US 2019/0367211 A1    Dec. 5, 2019

Related U.S. Application Data

(63) Continuation of application No. 15/316,076, filed as application No. PCT/GB2015/051620 on Jun. 3, 2015, now Pat. No. 10,427,834.

(30) Foreign Application Priority Data

Jun. 4, 2014    (GB) ..................... 1409926

(51) Int. Cl.
*B65D 19/00* (2006.01)
*E04C 2/32* (2006.01)
(Continued)

(52) U.S. Cl.
CPC ............ *B65D 19/004* (2013.01); *A63C 17/01* (2013.01); *B32B 3/12* (2013.01); *B62D 35/001* (2013.01); *B65D 5/001* (2013.01); *B65D 5/441* (2013.01); *B65D 19/0018* (2013.01); *B65D 19/0026* (2013.01); *B65D 19/0048* (2013.01); *B65D 19/385* (2013.01); *E04C 2/08* (2013.01);
(Continued)

(58) Field of Classification Search
None
See application file for complete search history.

(56) References Cited

U.S. PATENT DOCUMENTS

| 2,391,997 A | 1/1946 | Noble |
| 2,481,046 A | 9/1949 | Scurlock |

(Continued)

FOREIGN PATENT DOCUMENTS

| CA | 2243080 A1 | 7/1997 |
| CH | 284305 A | 7/1952 |

(Continued)

OTHER PUBLICATIONS

Written Opinion of the International Searching Authority in corresponding PCT Application No. PCT/GB2015/051620.

(Continued)

*Primary Examiner* — David Sample
*Assistant Examiner* — Elizabeth Collister
(74) *Attorney, Agent, or Firm* — Alfred Y. Chu, Esq.; Brian B. Shaw, Esq.; Harter Secrest & Emery LLP

(57) ABSTRACT

A structural element (10) for forming a panel, with an upper plane (12) and lower plane (14) which are parallel and deformed along their plane at intervals by pods (16) which extrude toward the opposing plane with their internal faces mating to one another.

20 Claims, 20 Drawing Sheets

(51) Int. Cl.
  *B32B 3/12* (2006.01)
  *B62D 35/00* (2006.01)
  *E04C 2/34* (2006.01)
  *E04C 2/08* (2006.01)
  *A63C 17/01* (2006.01)
  *B65D 5/00* (2006.01)
  *B65D 5/44* (2006.01)
  *B65D 19/38* (2006.01)

(52) U.S. Cl.
  CPC .... *E04C 2/326* (2013.01); *B65D 2519/00019* (2013.01); *B65D 2519/00024* (2013.01); *B65D 2519/00029* (2013.01); *B65D 2519/00034* (2013.01); *B65D 2519/00039* (2013.01); *B65D 2519/00044* (2013.01); *B65D 2519/00054* (2013.01); *B65D 2519/00059* (2013.01); *B65D 2519/00064* (2013.01); *B65D 2519/00069* (2013.01); *B65D 2519/00074* (2013.01); *B65D 2519/00079* (2013.01); *B65D 2519/0094* (2013.01); *B65D 2519/00268* (2013.01); *B65D 2519/00273* (2013.01); *B65D 2519/00288* (2013.01); *B65D 2519/00308* (2013.01); *B65D 2519/00318* (2013.01); *B65D 2519/00323* (2013.01); *B65D 2519/00333* (2013.01); *B65D 2519/00338* (2013.01); *B65D 2519/00562* (2013.01); *B65D 2519/00572* (2013.01); *E04C 2002/3483* (2013.01)

(56) References Cited

U.S. PATENT DOCUMENTS

| | | | |
|---|---|---|---|
| 3,086,899 A | 4/1963 | Smith et al. | |
| 4,279,204 A | 7/1981 | Propst | |
| 5,958,551 A | 9/1999 | Garcia-Ochoa | |
| 2002/0112653 A1* | 8/2002 | Moore, Jr. | B65D 19/0012 108/57.25 |
| 2003/0108700 A1* | 6/2003 | Krech | B65D 19/38 428/35.7 |
| 2004/0096628 A1 | 5/2004 | Saathoff et al. | |
| 2004/0159267 A1 | 8/2004 | Markling et al. | |
| 2005/0155528 A1 | 7/2005 | Moore, Jr. et al. | |
| 2006/0177635 A1* | 8/2006 | Pepe | B32B 3/12 428/174 |
| 2007/0243408 A1* | 10/2007 | Straza | B23K 1/0008 428/687 |
| 2008/0122610 A1 | 5/2008 | Muirhead | |
| 2009/0025616 A1 | 1/2009 | Merrill et al. | |
| 2012/0231214 A1 | 9/2012 | Straza et al. | |
| 2012/0312200 A1 | 12/2012 | Monteith | |
| 2015/0165724 A1 | 6/2015 | Cox et al. | |

FOREIGN PATENT DOCUMENTS

| | | |
|---|---|---|
| CN | 102356202 A | 2/2012 |
| DE | 3217573 A1 | 11/1983 |
| EP | 1215037 A1 | 6/2002 |
| EP | 1306311 A2 | 5/2003 |
| EP | 1491327 A1 | 12/2004 |
| EP | 2631064 A1 | 8/2013 |
| FR | 1245009 A | 11/1960 |
| GB | 996805 | 6/1965 |
| GB | 2436553 A | 10/2007 |
| JP | S49-114685 A | 11/1974 |
| JP | H06-316015 A | 11/1994 |
| JP | H09-267841 A | 10/1997 |
| JP | 3654256 A | 6/2005 |
| JP | 2006001036 A | 1/2006 |
| JP | 2009107144 A | 5/2009 |
| RU | 77788 U1 | 10/2008 |
| WO | 97/26197 A1 | 7/1997 |
| WO | 0216214 A2 | 2/2002 |
| WO | 02/099218 A1 | 12/2002 |

OTHER PUBLICATIONS

Search Report in corresponding United Kingdom Application No. GB1409926.1.

Office Action from Japanese Patent Office, dated Mar. 26, 2019 (9 pages).

* cited by examiner

Ⓐ - Material from 0.3 to 0.4 mm
Ⓑ - Pressing depth from 25 to 30 mm
Ⓒ - Beams closer together

STRUCTURAL ELEMENT

FIELD OF THE INVENTION

The present invention relates to a structural element, and more specifically the manufacture and use of a structural element to form sheets, panels or pallets with a high resilience to external tensile and compressive forces whilst maintaining mechanical stiffness.

BACKGROUND OF THE INVENTION

A panel, it its simplest form, may comprise of a sheet of material. It can be single ply or multi-ply. The desirable attributes of the panel would depend on the situation it is required for. For instance, a panel used as a covering would be expected to be less rigid than a panel used for a roof and a panel used as a platform which people stood or walked upon would need to have resistance to lateral point stresses in addition to being rigid.

By increasing the thickness of the panel (or by adding more sheets and varying the gap between those sheets) the same material may be used for a panel in which the rigidity and strength can be varied. An increase in thickness of the material will increase the amount of material used and this in turn this would increase the weight and costs of the material. Instead just varying the space between the sheets or plies can achieve similar strength or rigidity changes, but without the considerable increase in material costs—only the material cost of any additional spacing materials would be incurred.

It is known to use these techniques to increase the strength of a panel whilst minimising the increase in material used. Other techniques are also known. These include varying of the shape of the panel, such as using corrugations, or by using composites where different materials are combined, such as foam filled fibreboard. Another method is to combine these techniques, for example where a shaped material forms the internal structure of a panel. These methods are not without their own issues: such structures may result in unidirectional strength, or additional costs in the manufacture of the complex structures, and more costly recycling in the case of composites, and this can outstrip the benefit of the material saving.

It would therefore be desirable to create a structural element where, compared to a sheet of material, the strength can be increased without the addition of further material, and thus weight. It would also be desirable for the structural element to be versatile, for example not having a preferred orientation for its use. It would also be desirable for the structural element to be easy to manufacture.

SUMMARY OF THE INVENTION

The present invention provides a structural element made from sheet material that is deformed at intervals along its length and width to provide pods that protrude from the plane of the sheet where the walls of the pods slope obliquely relatively to the plane of the sheet.

The present invention also provides a structural panel consisting of two outer sheets that act as the tensile and compression chords, both with multiple inwardly orientated pods throughout the panel and who's apexes are joined together, which have a close proximity one to another in order to be mechanically interdependent creating a double depth space-frame lattice type matrix where loads placed on the panel's surface are resisted and transferred through the chords and with the pods acting as interconnecting diagonal braces.

In a preferred aspect of the present invention at least two sheets are formed with such pods, and two of the sheets are juxtaposed to each other in mirror-image, or facing, fashion, with floors of the pods engaging in contact zones.

Preferably the two engaging sheets are of similar (or substantially identical) size and/or shape.

Preferably the two engaging sheets are joined in the contact zones to provide a unitary element formed of the two sheets. The join may be by any known method or means, such as an adhesive joint, a weld or by use of folded or rolled flanges, or by combinations of such, or other, known joining methods.

Preferably the pods are frusto-conical in shape.

Preferably the floor of the pod is circular.

Preferably a part of the floor or base of one or more of the pods may be removed to enhance the lightness of the finished element. Preferably this is done leaving a flange, more preferably an annular flange, e.g. by removal of a central disc.

Preferably the contact or the jointing between the two engaging sheets takes place at or along the flange(s).

The relationship in the individual pod geometry, and the strength of the resulting structural element, can be guided or influenced by the ratio between the pod opening's dimension (at its intersection with the sheet—a diameter when round) and the depth of the pod. This geometry, and the degree or direction of influence, is governed by the extent of the stretch of the material resulting from the deformation, i.e. the amount or extent of elongation of the selected material. In the case of steel, there can be a significant degree of stretch before the material reaches a yield point, or a point at which additional strength is not added, and that extent of stretch can be varied by controlling the stretch, for example through use of variable formers, multiple passes or heated formers. However, for cost efficiency it is preferred to use just a single pass through a press—reduced processing time results in reduced manufacturing costs, and thus reduced commercial prices or increased profit margins.

For steel, it is preferred that the extent of stretch of the material from the sheet used to form the pod is about 30%, and more preferably between 20 and 40%. The extent of stretch can be calculated as 30% when the development length through the centre of the formed pod, from sheet edge to sheet edge, is 1.3× the diameter of the pod (at its intersection with the upper surface of the sheet.

30% is a preferred extent of stretch for a single pass pressing process.

If there are multiple passes through the press then this percentage may be different—for example the stretch can generally be longer without approaching a yield point. Nevertheless, single passes are more economic, and are thus preferred for mass production of structural elements of the present invention.

A variety of methods or means may be adopted to join the contacting pods together—for example different methods at different pods, or the same at each pod, but with different structural elements having different methods of jointing. The present invention might then comprise a product comprising two different forms of structural element, both formed in accordance with the present invention, e.g. a pallet top and pallet legs, the pallet top formed using one form of structural element and the legs being formed from a different form of structural element, but both forms being in accordance with the present invention.

Preferably loads when applied transverse to a top plane of the structural element, e.g. to a top sheet thereof, are transmitted to a bottom or different plane of the structural element, e.g. to a bottom sheet of the structural element. Typically this will occur since loads when applied to a first sheet of the structural element are transmitted along or through the surfaces or structure of the pods of that first sheet to the opposing pods on the second sheet through the jointing or contact therebetween, the load thus transferring to the bottom or other sheet of the structural element. The structural element thus has similar or comparable load handling characteristics to a space frame.

Preferably loads when applied to a plane of a sheet of the structural element are transmitted along the surfaces of the pods in multiple directions such that the load is distributed throughout the structural element. This can offer greater advantages than a space frame since in a space frame the loads are handled generally along the structural members, whereas in the present invention they can additionally be carried circumferentially and radially through the walls of the pods.

Although in a first embodiment the pods may be generally frustoconical, thus having a predominantly circular section (and thus only one side—a conical side), in other preferred embodiments one or more of the pods, and preferably each pod, can have more than one side. It is preferred that these sides are each composed primarily of a flat area, although they might instead be fully curved, albeit not at a radius that would create the full cone, i.e. a larger radius than that for assuming a capsule (2 side), triangle (three side), square or rectangular (four side) or other polygonal shape (more than 4 sides, or non-regular shapes). The sides can also be corrugated if desired for added compressive rigidity for the structural element.

It is preferred that at least one of the sides of a pod meets one or more adjacent side of that pod along a generally linear region so as to form ridges in the shape or surface of the pod. The ridges perform a stiffening function, as would the above-mentioned corrugations. The ridges can be relatively square edged, i.e. with an external radius of less than 2.5 mm, or 5% of the length of the longest side of the pod, measured at the outer surface, or mouth, thereof—e.g. at the top plane of the sheet in which it is formed, or it may be more rounded so as to reduce stress concentrations. In that regard, zones of the pod outside the flats are more preferably curved.

In one arrangement of the pods, the mouths of the pods are substantially square and the pods occupy substantially the whole of the upper reference plane (for an upper sheet), just leaving a grid for that upper plane where the pods meet at their upper edges. The grid defines lines, the lines forming ridges in the reference plane. The ridges enhance the stiffness of the element, and leave a small area of contact between the structural element and any product placed thereon—that can be advantageous in some circumstances.

Preferably the joints between the adjacent pod floors are substantially in the central area of the panel. In some arrangements the joints between the pod bases are off-centre.

In some arrangements at least one of the engaging sheets is flat with no pods.

Preferably the structural element has a high resistance to forces applied to a sheet thereof, normally (transversely) to the plane of the sheet. Likewise it can have a high resistance to forces acting on it in any direction. The geometry of the structural element allows it to distribute these forces efficiently through the material from which it is composed so that the forces are widely dispersed and hence attenuated rather than acting along discrete lines of force or in discrete zones of stress.

Preferably the structural element is formed from metal. Many metals can provide the desirable toughness and durability, and can provide longevity and resistance to impacts. Steel and aluminium, or their alloys, are preferred due to their relatively low cost. Copper, brass, tin, nickel, titanium and magnesium alloys may be likewise be suitable for certain specialised applications.

Preferably the pods are formed in the sheet using a press.

Instead of metals, the structural element may be formed from a plastics material—typically a mouldable and/or formable plastic. The structural element might alternatively be made from a fibrous or a cellulose material such as paper or card.

The structural element might be moulded rather than formed. For ease and speed of manufacture, however, it is preferred for the structural element to involve a forming process for forming the pods. Forming processes are particular manufacturing processes which make use of suitable stresses (like compression, tension, shear or combined stresses) to cause plastic deformation of the materials to produce required shapes. Some examples of forming processes are forging, extrusion, rolling, sheet metal working, rotary swaging, thread rolling, explosive forming and electromagnetic forming.

In some embodiments, the pods leave spaces between them in the material of the plane of the or each sheet around the pods. This is necessarily the case where the pods are round. It is possible for those spaces to be left flat. This minimised the degree of working required for forming the sheet. However, the material of the plane of the sheet around the pods can instead be provided with strengthening portions, such as corrugations, ridges or folds. These can improve or increase the bending stiffness of the structural element, an effect that is increased if they are not all monodirectional (i.e. all extending in the same singular orientation).

Preferably the pods are arranged in rows on the plane of the sheet. A uniform arrangement assists with the efficiency of the forming process. In a preferred arrangement adjacent rows are staggered. This is particularly preferred, albeit non-essential, for round pods or for triangular pods, or for pods having more than 4 sides. That is because it allows a more dense packing of the pods onto the sheet surface, and also a non-continuous longitudinal and transverse beam pattern along the length of the structural member (the beams instead become diagonal), thus often increasing the stiffness of the structural element in its normal use configurations.

Preferably the structural element is generally planar or flat, although it can be formed to have profiled shapes, e.g. for vehicular bodywork. It can also have profiled or variable thicknesses. See FIG. 8E—views i) to v) for examples, i) being flat, ii) having a curved top, iii) having a curved top and bottom, iv) being convex (or concave) and v) being wavy.

The structural element may even have one or more flat or planar area and one or more curved area.

Preferably the connected pods form substantially diamond beam formations with adjacent connected pods such that multiple diamond beam structures are formed throughout the structural element. These will occur in the negative space immediately between pairs of joined pods. Where the pods are square or triangular, or where polygonal with interfacing sides, such as with intermeshing regular hexagons, or a mix of aligned hexagons and intermeshing rhombuses, these diamond beam structures can be elongated to define a grid of diamond beam structures.

The substantially diamond beam structure can be such that there is a flattened, rather than pointed, top or bottom. As such the apices of the diamond beams in contact with the plane of the sheet are truncated, thus forming a frustum. More preferably the diamond beam is a bifrustum.

Preferably the frustum's minimum width on a given diamond beam is no more than half the width of the diamond at that section, and more preferably no more than one third of the width of the diamond at that section. Areas of the beam away from the minimum frustum width part,—i.e. where the pods are round, can be wider than that.

Preferably the height of the diamond is no more than double the width of the diamond—from frustum to frustum where frustums are present.

Preferably ribs are provided on the panel surfaces where there is an extended gap between the diamond beams. This can be, for example, where the apex of the diamond beam is not coincident with the chords or diagonals formed by the pods, i.e. on the frustums, or where the frustum's minimum width exceeds the above half width or one third width of the diamond at that section, or elsewhere where there is an extended flat on the panel. The ribs can be directed across the gap, for example perpendicular to the pod edge, or parallel to the pod edges, or otherwise. In place of ribs, these reinforcements may be corrugations or domes or other deformations for resisting crumpling, bending or other deflection or failure of these areas.

The depths of the pods will typically be in the range 7 to 20 mm.

The side angles preferably are predominantly between 30 and 80° from the plane of the upper or lower surface of the structural element.

Preferably approximately 30% of the surface of the sheets remain in the reference plane—the pods account for the remaining 70%. Preferably that reference plain includes no less than 10% of the sheet, and no more than 40%. Any ribs included in those surfaces are included in the percentage—only the pods/cones are not included.

In many embodiments the pods are conical. This shape will result in a resistance to twisting or coiling of the panel, especially if the pods are arranged in staggered and intermeshing rows. Round pods also cause webbing to be present between the pods and the diamond beams (where present). If that webbing is also corrugated or ridged, this further increases the resistance to twisting of the panel.

Foam can be provided between the surfaces of the panel. This can then offer insulation or soundproofing properties Preferably the materials used for the panel have a strength to weight ratio of about, or at least, 10:1 compared to conventional wooden or plastic equivalents. In this regard, steel is a preferred material as it is commonly 10 times stronger than wood and plastic on a weight for weight basis.

The present invention also provides a method for producing a structural element comprising providing a sheet material, deforming deformed it at intervals along its length and width to provide pods that protrude from the plane of the sheet where the walls of the pods slope obliquely relatively to the plane of the sheet, providing a second sheet, deforming it at intervals along its length and width to provide pods that protrude from the plane of the second sheet where the walls of the pods slope obliquely relatively to the plane of the second sheet, juxtaposing the two sheets such that the pods are juxtaposed to each other in mirror-image or aligning fashion and such that floors of the juxtaposed pods engage in contact zones, and joining the sheets in the contact zones to provide a unitary element.

Preferably the deformation is automated.

Preferably the two sheets are deformed at the same time.

Preferably the deformation is a single pass pressing action. A press machine can be used to do the deformation operation.

The deformation may be carried out using, or in conjunction with, any one or more of the following operations: bending, stamping, punching, blanking, embossing, bending or flanging.

The manufacture can be via an extrusion or pulltrusion technique, although pressed or moulded forms are more preferred.

The method can be a single pass manufacture technique.

The method preferably uses a coil fed high speed production line, for example producing around 20 pallets per minute. High speed includes flat sheet feed speeds in excess of 10 m per minute.

Preferably the sheets are joined at the contact zones by welding. Other jointing processes may also or instead be used, such as folding flanges, crimping or gluing.

Preferably at least parts of the floors of the pods are removed when, or prior to, the two sheets/contacting pods are joined together. This creates holes and is particularly beneficial for pallet applications, and other non aerodynamic applications, so as to allow reduced weight and easier washing. Other applications, however, might not benefit from such holes. For example, truck body panels would preferably not have such holes, especially where the panels are external body panels—just the pods may provide an aerodynamic benefit, but adding the holes would create an aerodynamic disadvantage.

Preferably the sheet material is plastically deformable.

Preferably the sheet is locally stretched when the pods are formed. Forming the pods thus does not change the mass of the sheet, but it adds depth to the sheet.

Preferably the pods create a depth for the panel that is at least 20 times the thickness of the material of the sheet, and more preferably at least 50 times that thickness, and often more than 80 times that thickness.

In one embodiment the depth is at least 88 times the thickness of the material of the sheet. In another embodiment the depth is at least 160 times the thickness of the material of the sheet.

Preferably the structural element is a panel used to carry loads upon its outer surface—i.e. over the mouths of the uppermost pods.

Preferably the structural element forms a part of a product. As such it may be a panel that is raised off the ground by a base, which base may be formed by legs, skids or otherwise, the base being for suspending the panel above the surface of the ground. One example of this kind of product is a pallet. Another is a skateboard, where the base is a pair of wheel assemblies.

The base may be an integral part of the structural element—e.g. being moulded onto or formed from one or both of the joined sheets. Alternatively it is a component fitted to the panel, for example after the panel is formed.

The base for the structural element may take the form of a cup shape, and it may be pressed from one or both of the joined sheets.

In an alternative arrangement, the base for the structural element may take the form of a half cup shape—cut in half vertically. Again it may be pressed from one or both of the joined sheets.

Preferably the base allows nested stacking of corresponding pallets, with the bottom of the base of a first pallet fitting into an opening in the top of the corresponding base of a second pallet. Cup and half cup bases readily achieve this function. Other base designs offering this function—often featuring pallet legs, are also well known in the art of moulded pallets. Such designs can be incorporated into the present invention by adding such legs or bases to pallets featuring the structural element of the present invention as the top thereof.

Preferably the base is shaped such that when multiple pallets are stacked, the bottom of the base of a first pallet will sit below the upper plane of the structural element of the pallet below it. This is partial nesting. More preferably the bottom of the base of a first pallet will sit below the lower plane of the structural element of the pallet below it. This is full nesting and it allows a more compressed nesting of the pallets, which is important to reduce the space occupied by empty pallets which are being stored or transported. Preferably the nesting can be such that the underside of the structural element of the first pallet is located close to the top side of the structural element of the second pallet—i.e. closer than the thickness of the structural element.

In an alternative arrangement the base of the structural element is one or more skid. The skids might be welded onto the structural element. In another arrangement the skids are adapted so as to be detachable (e.g. bolted or clipped thereon).

Preferably the structural element, when raised off the ground with a base (or more than one base), is a pallet, whereby objects can be stacked or stored on the pallet for storage or transportation.

Preferably the width and length of the structural element corresponds to a standard pallet size. Typical pallet sizes include 1200 mm×1000 mm, 1200 mm×800 mm and 800 mm×600 mm.

Preferably the pallet formed using the structural element and the at least one base has a clearance afforded by the base to allow forks of a forklift truck or pallet truck to fit underneath the structural element,—e.g. between the ground and the underside of the structural element, or between stands of the base, and under the underside of the structural element.

Prior art pallets have been formed using pairs of sheet material spaced apart by deformed sheet material, where the spacing and locations of the deformed sheet material are such that forks of a forklift truck or pallet truck fit between the sheets. The present invention does not provide that function—the pods of the structural element panel are located so as not to provide appropriate openings for forks of a forklift truck or pallet truck. In that respect the pods extend over substantially the entire extent of the sheets, save for perhaps the edges and the inevitable lost space between the circles (where circles are provided). There is thus no space for penetration of a forklift fork. Further the often staggered arrangement results in no through passageways whatsoever.

It is preferred that the pods are not stretched, dissected or deformed for the purposes of forming the pallet, or for forming holes for forklift penetration. Instead the pallet of the present invention is provided such that the lifting of the pallet with forks is from the underside of the structural element and not via gaps or slots formed in the structural element. As a result, loading on the structural element remains externally applied and not initially internal. This ensures both layers of the structural element carry the full load with a compressive element, thus improving the strength of the pallet.

Preferably the or each base is shaped and located to extend from within the structural element. The base should have parts that are within the structure of the structural element such that when it is subjected to a side load, its structure in combination with the structure of the structural element, are exposed to the load and not solely the base. This adds to the strength of the pallet.

Preferably the base(s) of the pallet extends from the edges and/or corners of the structural element. For instance, in the case of legs, a leg extends from each corner of the panel. For a typical pallet shape, this is a total of four legs. More legs can be provided—along the edges or elsewhere—i.e. not on the edges or corners, or they can only be provided not on the edges or corners. Spacing them widely, however, gives the pallet greater stability when loads are placed vertically onto the pallet, especially at the edges thereof.

Preferably at least one edge of the structural element overhangs the base, such that the length of the structural element is greater than the distance between the outermost edges of the base in the direction perpendicular to that overhanging edge. Preferably the overhang is longer than the width of the leg's/base's bottom (still measured in that same direction). This then allows the base of a first pallet to stand on the top of a second pallet, upon reversing its horizontal orientation, without nesting of the two pallets. This also allows the stacking of pallets one above another by inverting one above another with the bases intermeshing. See FIG. 17. This can be a useful mode of stacking for where it is desirable to maintain a wider gap between the structural elements of two stacked pallets than that achieved with nesting. As shown in FIG. 13, however, the nesting function and wider stacking function can both be achieved with some designs.

Preferably the pallets, when stacked with the base stood on top of the structural element of the pallet below it, are relatively rotated such that the overhang alternates from one edge to the opposite edge. This can be done in repeating pairs. This maintains the same centre of gravity for every two stacked pallets, and increases structural stability when stacking without nesting.

Preferably the pallet has grooves or slots in the upper surface to allow the locating of the base of a second pallet when stacking without full nesting, i.e. only partial nesting.

The use of grooves ensures that the pallets are stacked in as stable, and non-sliding manner. It also makes the stacking uniform, thus maintaining a consistent centre of gravity. The grooves are preferably adapted to correspond in shape with the bottom of the base so as better to prevent the sliding of the pallets relative to one another once stacked.

Preferably the pallet is provided in combination with a base plate onto which the base of the pallet may stand. Preferably the base plate has grooves or slots into which the base(s) of the pallet can fit. As with the grooves or slots in the top of the pallet, these can offer greater stacking stability and support.

The use of a base plate allows the pallet to be used on conveyer belts, such as in a production line, without a need to invert the pallet (i.e. for placing the structural element's surface (which is more flat than the base) onto the conveyor belt). It also permits the pallet to be otherwise maneuvered if the base plate is fitted with wheels or rollers.

Preferably the structural element, or the product incorporating the structural element, has wireless, RFID, NFC or other electronic communication devices incorporated therein to allow remote electronic identification. Preferably, where the structural element is formed from metal or an electrically conductive material, the structural element us used as an aerial. The use of RFID and other contactless communication technology is useful for tracking products, and particularly pallets, for transportation and inventory purposes. Where a wireless technology is used, the need for the pallet to be facing in a particular direction for the scanning of a barcode is removed.

Preferably the structural element includes a means of counterfeit protection. More preferably, said counterfeit protection includes a specifically identifiable material or element within the material which forms the structural element. More preferably still, markings or watermarks could be present on the inner surfaces of the sheets.

Preferably the structural element has no blind recesses—i.e. through holes, whether straight or convoluted, are always present in each pod and between the sheets if open at the edges. This reduces the weight of the pallet and also increases airflow around the object on the pallet, along with preventing liquids from gathering in the pods during storage and transportation and allowing more easy cleaning when the product is for multiple usage (pallets can be disposable if made of cardboard or wood, but plastic pallets are often reusable in a pooling system, and pallets made using the present invention can likewise be reusable and thus being easily washable becomes beneficial.

The structural element may be used in other configurations too, bet they with a flat panel or a curved panel, or both. These uses may include, but are not limited, to panels on vehicles or packaging, furniture surfaces, building materials, platforms, etc.

BRIEF DESCRIPTION OF THE SEVERAL VIEWS OF THE DRAWINGS

These and other features of the present invention will now be described in further detail, purely by way of example, with reference to the accompanying drawings, in which.

DETAILED DESCRIPTION OF THE INVENTION

Figure 1:
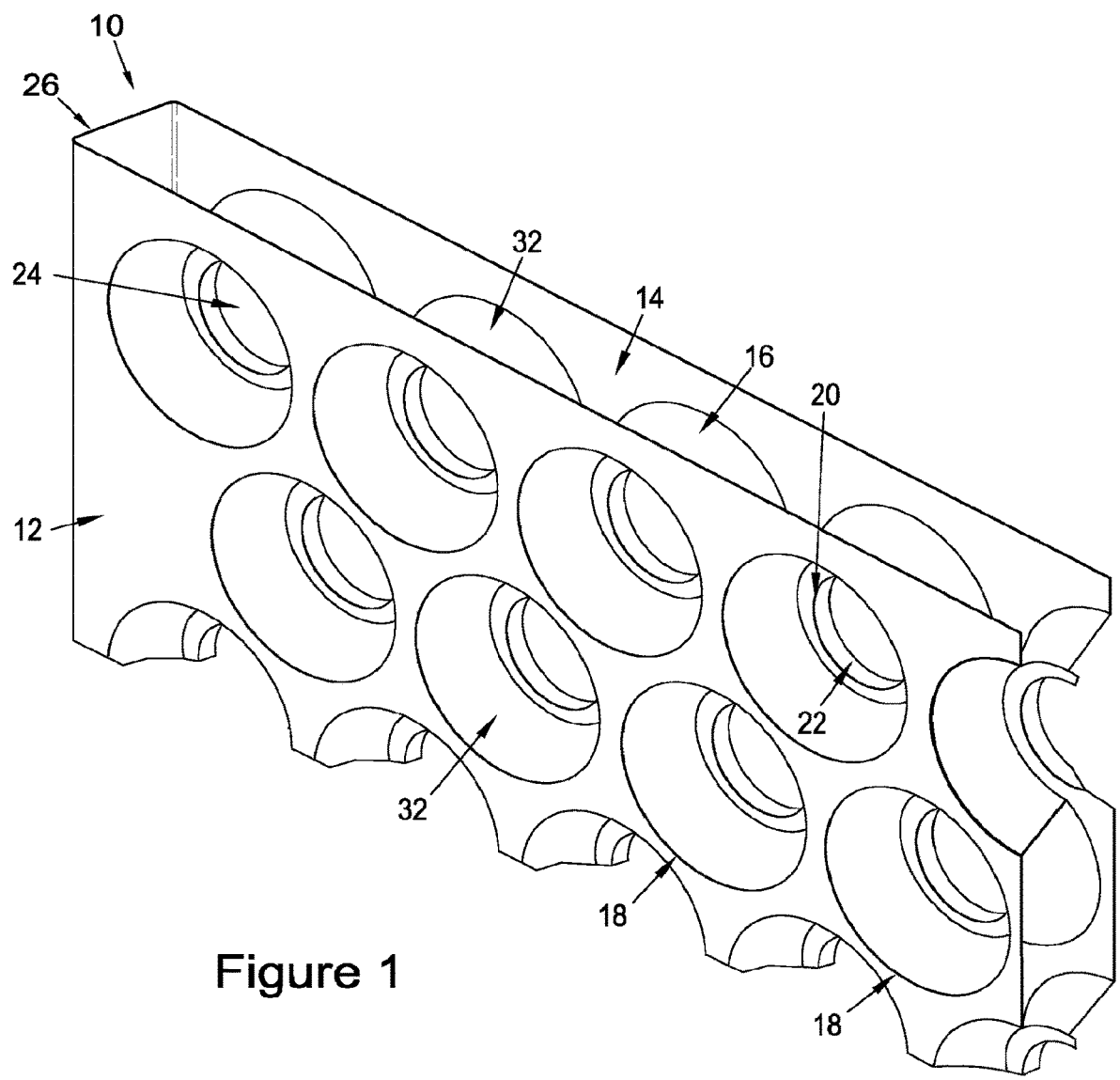
FIG. 1 shows a perspective view of a first embodiment of structural element according to the present invention—a cut-away slice of a larger element.

Referring first of all to FIG. 1, a structural element 10 is shown. The structural element has sheets which form an upper plane 12 and a lower plane 14. These planes sit parallel to one another at a defined distance apart. On the surfaces of the upper plane 12 and lower plane 14 are circular holes 18. These circular holes 18 are present on both planes and are arranged such that they are in-line with the opposing circular hole 18 of the parallel plane. The circular holes 18 are arranged such that they sit in rows. Each row is offset with the row of circular holes 18 above it, such that alternative rows form a column of circular holes 18.

Although this specific description describes upper and lower "planes", it should be appreciated that the planes may be replaced with curved sheets, thus they would then not be planar. For convenience, the word "plane" will nevertheless still be used.

Further, although circular holes are disclosed (and, later, square holes), other shapes of hole are also possible, including regular and irregular shapes.

Extending from the planes into the void formed between them, i.e. toward the opposing plane, are cones 16. These cones 16 define the pods and are circular in this embodiment, with the base of each cone 16 (in the plane—defining the circular holes 18) defining a mouth for the cone that is circular (albeit with rounded edges).

The other end of the cone—the apex of the cone 16, is truncated to form a frustum 20, the truncation being made parallel to the plane and the circular hole 18. Rounded edges, however, are again provided at that apex. The rounded edges reduce stress concentrations and provide a cleaner appearance.

The resulting frustum 20 of the cone 16, in respect of the upper plane, extends from the sheet defining the upper plane 12, and it will line up with the frustum 20 of a cone 16 extending from the sheet defining the lower plane 14. As such pairs of frustums 20 of pairs of cones 16 can mate to form a connection between the two planes with the circular holes 18 in each plane being aligned.

Figure 3:
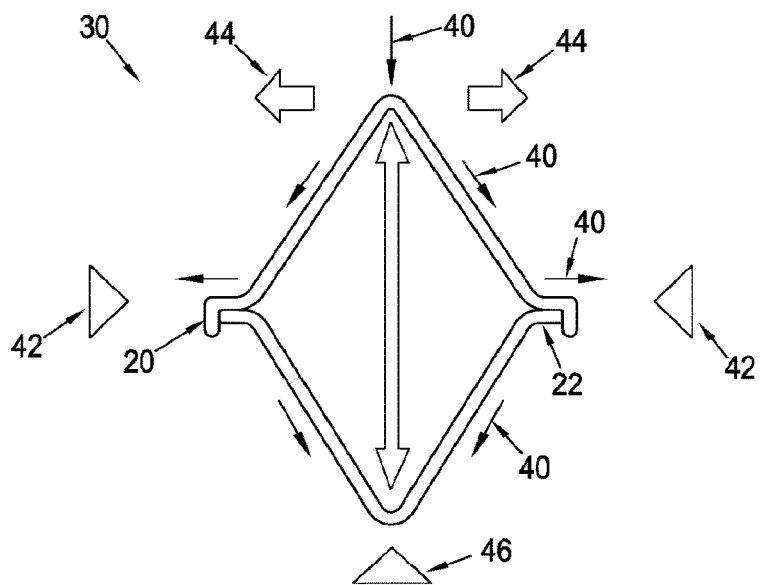
FIG. 3 shows a sectional schematic of a diamond beam formed within the structural element of the present invention.

In FIG. 1 there is also shown to be a hole cut into the frustums 20 of the mating cones and the hole of one of the frustums has a lip 22 which extends as shown in FIG. 3 to allow a jointing, such as by crimping or welding, of the two frustums 20. The apex or frustum 20 of the two joined cones 16 are thus open at their middles and form a central circular hole 24. In this embodiment, since the mating cones are similar to one another (almost mirror images except for the lip 22), that circular hole 24 defines a medial plane, lying across a line parallel and equidistant to the upper plane 12 and lower plane 14.

Referring again to the cone in the upper sheet, the cone 16 is hollow, with, aside from the lip 22, the surface of the cone 16 laying generally along the line extending between the outer edge (the outer end of the rounded edges) of the frustum 20 and the circular hole 18 (inner end of its rounded edges) which forms the mouth. The area in which this surface lays, being a cone, can be referred to as the generatrix 32 of the respective pod.

There are a plurality of these cones, and in this embodiment they are provided in a regular array.

The sheets which form the upper plane 12 and lower plane 14, when forming a structural element 10, can form an enclosed panel by having a side edge 26. The side edge 26, in this embodiment, is a junction where the sheets of the upper plane 12 and lower plane 14 are folded toward one another such that they are no longer parallel and extend so that they meet or overlap thus forming an edge 26. Alternatively a side sheet can be attached to the edges of the sheet (either via, or to, folded flanges). However, it is preferred to use the sheets for the upper and lower planes since that reduces the component count of the final product.

Techniques for manufacturing the structural element and forming the cones 16 and edges 26 are discussed later in this document. However, suitable methods include press-forming or roll-forming, amongst others.

Figure 2:
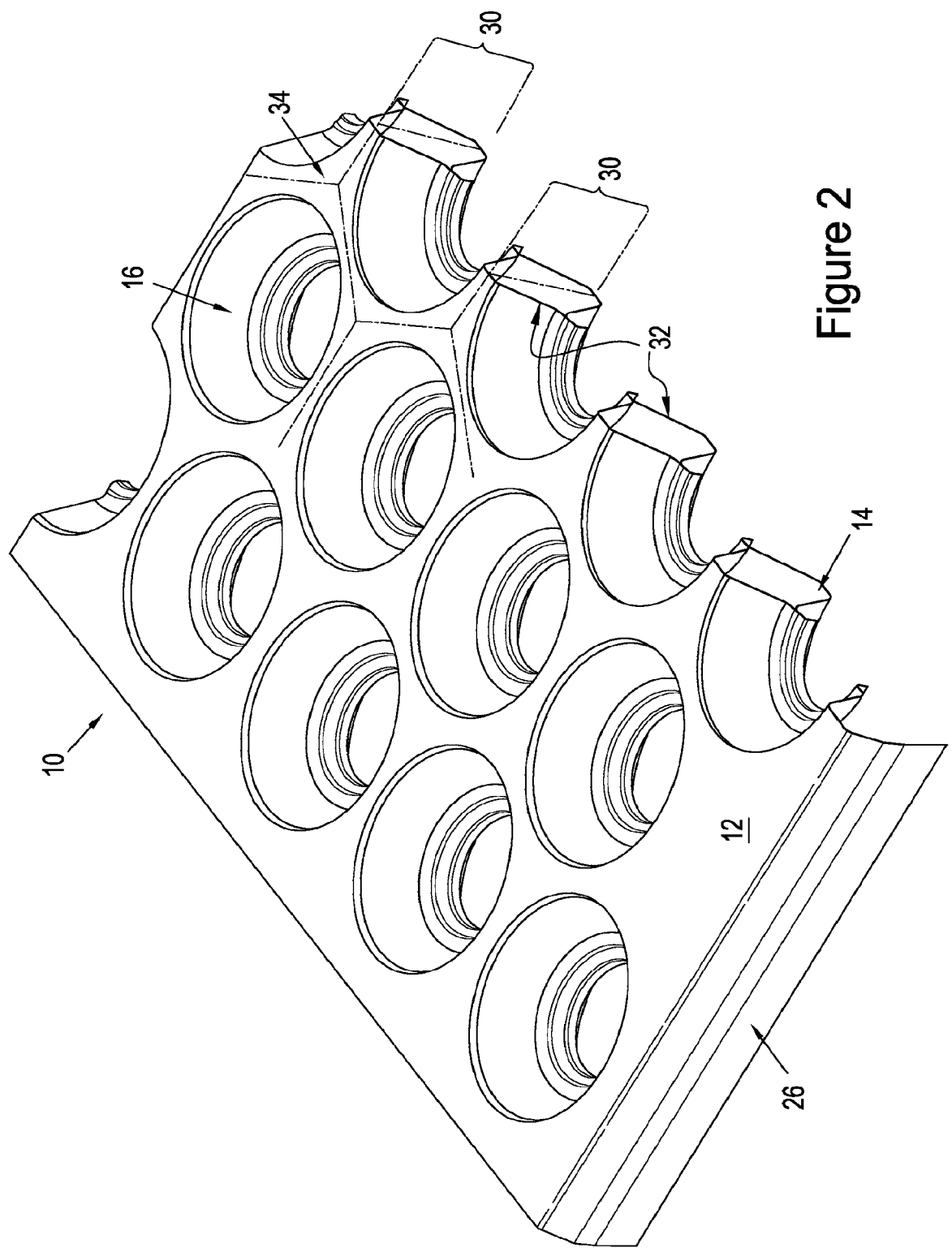
FIG. 2 shows the structural element of FIG. 1 from a different angle.

In FIG. 2, an alternative viewing angle is provided such that a row of cones 16 can be seen to have been vertically cross-sectioned, i.e. through from the upper plane 12 to the lower plane 14, to provide a view of the structure formed by the mated cones. Here it is seen that the sheet forming the upper plane 12 and the generatrix 32 of its cones 16 form a triangular shape along the cross-section line. The apex of this triangle is truncated to form a further frustum since the cones, and particularly circular holes 18 at their mouths, are spaced apart by a small percentage of the diameter of the circular holes 18 (in this example, about 11% of that diameter, although other embodiments may range from between 1 and 20%).

The base of this truncated triangular shape is abutted by the base of a similar truncated triangular shape formed by the sheet of the lower plane 14. The combination of these shapes is a shape similar to that of a diamond. Since this diamond shape extends parallel to the planes of the structural element (the panel), it forms a diamond beam 30. The diamond beam 30 is a result of the negative space left from the surfaces forming the cones 16 spanning the area between the upper plane 12 and lower plane 14.

There are similar diamond beams 30 formed throughout the structural element 10 in the space between the cones 16.

In this embodiment, this is a honeycomb arrangement, and some of these are shown by centre lines 34. The centre lines 34 show the vertical axis of the diamond beam 30 between the apices of the upper 12 and lower 14 planes which are truncated. Since the circular holes 18 are arranged in a staggered arrangement in this example, the centre lines 34 define hexagonal cells—the honeycomb structure. This is an efficient arrangement for the diamond beams. If the circular holes instead align in a grid, however, then the centre lines would likewise define a regular grid, with square angles, rather than 120° angles, between the "beams".

For this embodiment, since the pods are round, the diamond beams 30 extend as shown with their geometries varying—depending upon at which point along the beam thereof you are looking at within the grid or honeycomb of the structural element 10.

The side edge 26 is seen again in FIG. 2 and this again shows that where the edge of the structural element 10 is formed to form a panel, the cones 16 are not present in that zone of the sheet. As a result, no pod or cone is vertically truncated or otherwise distorted by the forming of the edges of the panel. This ensures that the diamond beams 30 are fully formed between all of the adjacent pairs of cones 16 and there is no weakened cone within the structural element. It also ensures that if edged panels are formed, then the edges of that panel will all be solid and smooth-walled. This can assist with functions such as the joining to other panels, forming a seal, or forming a smooth or regular edge for manual handling purposes.

Although the term diamond beam is used throughout the description of the invention, it is important to note that the geometry of the structural element is defined by various factors, such as manufacturing requirements, material choices, and visual geometry, i.e. the shapes of the pods, and as such it is a more complex shape than a strict replication of a geometric diamond beam. However, the resulting shape of the beams within the panel formed between the pods thereof, can nevertheless be effectively referred to as a diamond beam 30 since the created shape does share structural characteristics similar to those of a geometric diamond beam, recognising though the reduction in strength thereof resulting from the truncation of its apices.

A brief explanation of force loading within the beam as a result of loading applied to the panel, and thus also the diamond beam 30 of the present invention, is discussed below, with reference to FIGS. 3 to 7.

The diamond beams 30 created in the negative space throughout most of the structural element are important for the strength of the structural element 10.

Referring to FIG. 3, a single section through a diamond beam 30, similar to that which may be found in a structural element according to the present invention, is shown. The truncations at the apices are reduced compared to that of FIGS. 1 and 2 for the purpose of this illustration, which reduction can result from the circular holes 18 being packed more closely together, or from using other hole shapes or arrangements, such as the close-packed squares of FIG. 10.

In this example, force lines 40 are due to a compressive load on the upper plane 12 of the structural element 10 which is acting on the top apex of the diamond beam 30. The force lines 40 show the tendency of the load to act on the diamond beam 30 attempting to deform it by the resultant vertical forces and horizontal forces. To resist the horizontal forces 'opening' the diamond beam, apex force lines 44 represent the bracing resistance to deflection from the upper plane 12 and lower plane 14 which joins a braces surface between the diamond beam 30 apices. Reactive force arrows 42 show the restraint afforded by the truncated edge 20, which in turn forms the edge of other diamond beams 30. Thus the force lines 40 acting horizontally to open this diamond beam 30, are being transferred to diamond beams 30 within the larger area of the structural element 10. The lip 22 also forms a level of bracing against the force lines 40 acting horizontally, since the lip 22 is a horizontal piece, and in this version it is double thickness, and with a crimped part providing a L-beam type formation, thus offering good resistance to flexure and bucking. The resistance to vertical deformation from a load represented by force lines 40 is granted by the bracing to the apex force lines 44 and restraint resulting in the reactive force arrows 42 since a vertical deformation would require a horizontal deformation. In addition, the lower plane 14 would transfer the forces to other diamond beams 30 within the structure, and give a resultant vertical force 46 resisting the load.

FIGS. 4 to 7 further show the transferral of the forces within the structural element 10 between cones 16 and diamond beams 30 which grant the structural element its strength and resistance to deformation.

Figure 6:
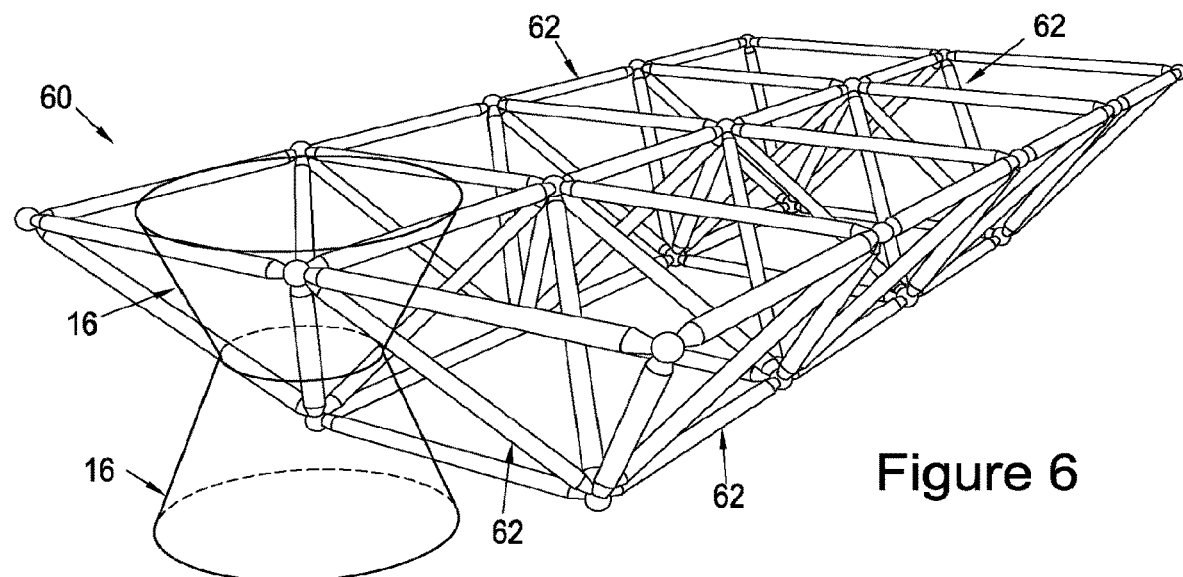
FIG. 6 shows a perspective view of a space frame, illustrating the comparison between the present invention and a space frame, the comparison being useful for understanding the strength underlying the structural element of the present invention.
Figure 7:
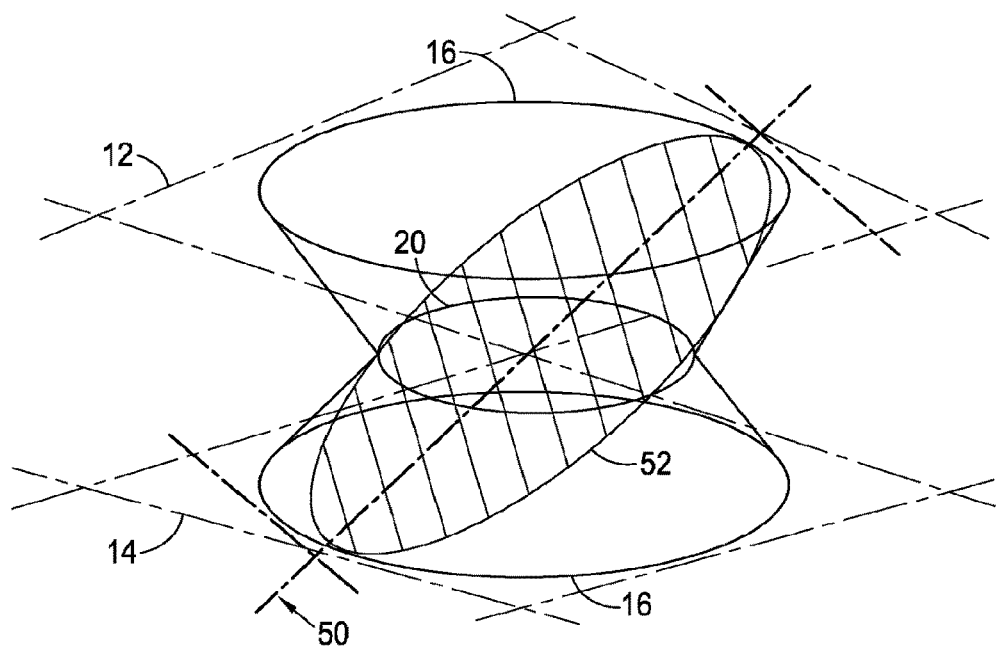
FIG. 7 shows a further schematic, in perspective view, illustrating force lines on a pod of the structural element of FIG. 1.

The transferral of forces in such a manner can be compared to a space frame 60 as shown in FIG. 6. A space frame transfers loads along the length of the beams 62 of the space frame 60 such that a single point load acts on multiple beams 62.

Figure 4:
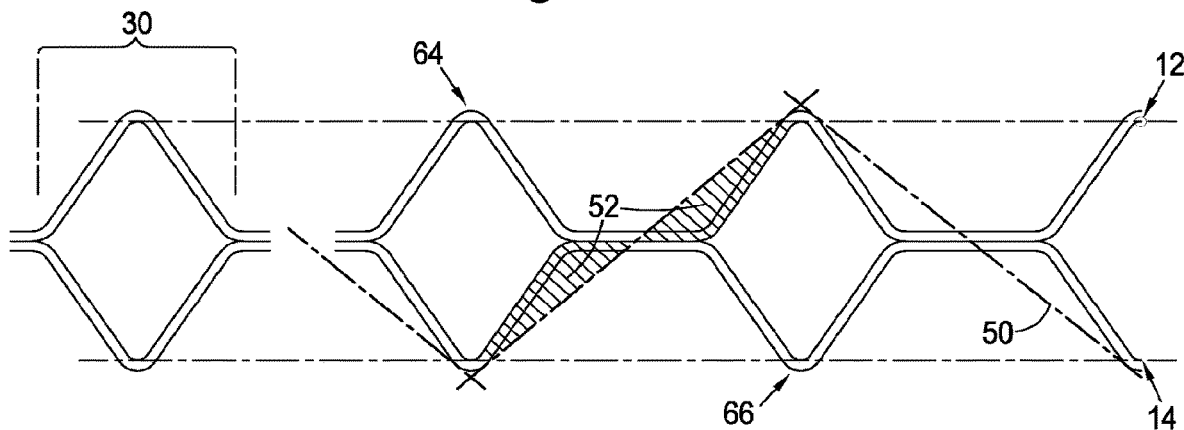
FIG. 4 shows a further sectional schematic of the structural element illustrating the action of forces acting on the structural element of FIG. 1.

A comparison of such a transfer to the structural element 10 of the present invention can be seen in FIG. 4, where diagonal force lines 50 represent the transferral of a load through a structure from upper apex 64 to lower apex 66 of adjacent diamond beams 30. The diagonal force lines 50 represent the typical beams 62 of a space frame 60.

The forces, in reality, would travel along and across the surfaces of the cones 16, to transfer a force between the upper plane 12 and lower plane 14, thus further spreading the loads. The area of force transferral 52 uses hashed lines to represent the area between diagonal force lines 50 and the route which the force would travel along the surface of a cone 16 if subjected to such a load. This force transferral can be seen in FIG. 7 where the area of force transferral 52 is shown not to follow a single diagonal force line 50, but travel along the surface of the cones 16. This shows the equivalence of the transferral of forces in the structural element 10 of the present invention compared to a space frame 60.

Figure 5:
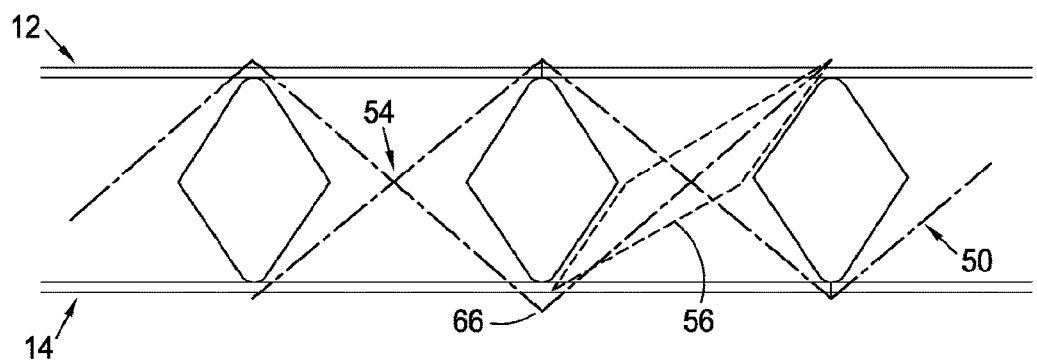
FIG. 5 shows a further schematic of forces acting on the structural element.

Referring to FIG. 5, an advantage of the structural element 10 is shown by cross braces 54, these are formed when diagonal force lines 50 cross. Cone force lines 56 provide a more probable representation of the route of forces through the structural element, although still result in cross braces 54 from the resultant force transferral. The result of these cross braces 54 is the transferral of the forces in multiple directions between the upper apex 64 and lower apex 66 of the diamond beams 30 and throughout the structural element 30 creating a matrix of compressive and tensile forces within the element when a load acts upon it. This structure thus offers the significant strength characteristics of a space frame, but without the complexity of joining multiple frame members or struts together to form that space frame.

A comparison to a space frame has been described here. However, whereas a space frame has a relatively straightforward predictability in terms of calculating its strength properties, with the structural element of the present invention the transferral of forces can be much more complex, especially where additional beams, ridges or surfaces are used in the structure of the pods or sheet materials This is since the structural element comprises load bearing surfaces between the "struts", such as the planes and cones as opposed to just beams and struts. However, for the purposes of demonstrating the generic structural advantage of the present invention, particularly when compared to other structural elements which may use cross bracing or sheet materials in their structure, the comparison to space frames is of use and relevance.

The structural element 10 can be formed from a pair of sheets of material in a pressing machine. The machine punches the material for forming the cones 16. This might be a single sheet that is then folded to form the two sheets in opposition to each other, or more usually—for reducing machinery cost—it is two separate sheets. As such a first sheet is so formed and another sheet is likewise punched with its cones 16, this time extending toward the original sheet, and the two sheets and opposing cones are then joined at the truncated edge 20 of the cones 16.

The two sheets can be concurrently pressed and then joined in a later process, or such that two continuous sheets are fed into a single pressing and crimping or welding machine to be made in one pass. Either way, the manufacturing of the structural element may be part of a high speed manufacturing line, e.g. taking the sheet(s) off one or more roll of sheet material.

Although pressing machines are referred to, any appropriate material manipulation methods may be employed. These may include but are not limited to stamping, moulding and high temperature cutting and the chosen process may depend on the material used to form the structural element. Various metals are suitable for the structural element material, and many of them have many of the above processes as being applicable for their processing. Steel is a preferred material, as is aluminium. Preferably steel can be coated with a corrosion-resistant finishing material that is applied to or impregnated into its surfaces. This adds to the longevity and reusability of the structural element.

An advantage of metals is that a number of them have very wide operating temperature ranges, typically including safe upper temperature limits at or above the range of 100° C. to 400° C. They can also be sterilised/autoclaved, and are non-flammable and hygienic, especially stainless steel.

The material to use is not limited to metal, as other materials may be used instead, these include plastics, paper or fibre based materials, graphene, composites, alloys, glass or glass fibre, ceramics, carbon fibre, plywood and laminated wood, chip board and plastic wood composites. The skilled person will also be aware of other appropriate material, depending upon the mode of manufacture to be used, be it forming or fabrication or moulding.

The material between the faces of the truncated edges 20 of the cones can be removed before or after joining the cones together, leaving a central circular hole 24. The removal of the material can thus be part of the first pressing process to increase efficiency, or it can be done later. It is not an essential step, and as such it can even be omitted if low weight is less critical. Nevertheless, the removal of the material will reduce the weight of the structural element 10 where this is a concern. In addition there may be advantages for having holes within the structural element for purposes such as ventilation. The removed material can also be recycled. However, if the material forming the faces of the truncated edges 20 remains, it can add addition strength to the structural element providing an additional surface for forces to be transmitted through, especially edge forces or skew forces.

The edges 26 of the structural element may be formed by bending of the sheet at each edge toward the opposing sheet and sealing or joining. The sealing or joining used at the edge, along with the joining of the truncated edges 20 of the cones 16 can use a number of material joining techniques such as crimping, riveting, welding, brazing, moulding, stapling, gluing, etc. The joining technique used can depend on the material used and the level of seal required. Materials can even be folded over one another in a loose-crimp or otherwise slotted or mechanically zipped together to form the structural element.

Figure 8A:
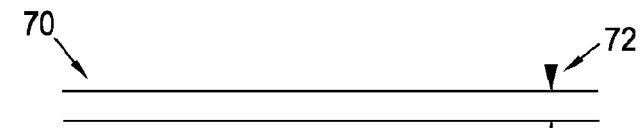
FIGS. 8A to 8C show side schematics of the variable thicknesses of a panel using two sheets and the pods of the present invention.
Figure 8B:
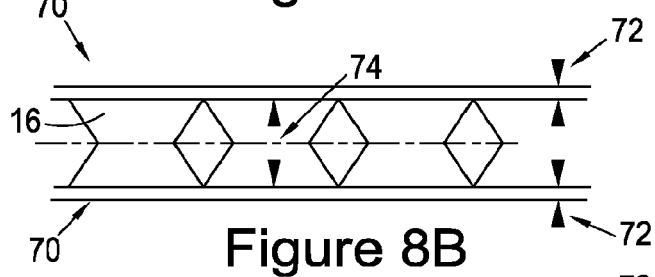

When forming the structural element from sheets, the thickness of the resulting structural element may be varied to alter the strength of the structural element. FIG. 8A shows a cross section of a sheet material 70 with a total thickness 72. This is a single thick sheet. This arrangement has a given strength. In FIG. 8B it can be seen that the sheet material 70 is cut in half to provide two half thickness sheets—i.e. the same amount of material, but from these two sheets it is possible to form the planes of the structural element 10, and also the pods or cones 16. The thickness 72 of the overall structure can thus be increased to increase the overall vertical load carrying strength of the structural element 10.

Figure 8C:
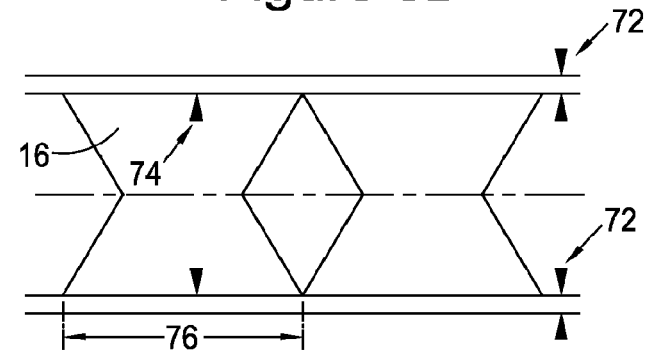

Referring then to FIG. 8C, the cones are stretched further—through larger circular holes 18. This can further increase the strength, although there will be limits to how far the material of the sheets can be usefully stretched. As such, there is typically a preferred maximum cone-angle of 75° from the plane, although angles between 45 and 80° would be likely to be used.

Increasing the thickness 72 of each sheet can provide thicker walls for the cones 16 too. This can be used to allow the distance between the two sheets (the plane distance 74) to be increased further, since there is more material which can be stretched to form the cones 16.

Figure 8D:
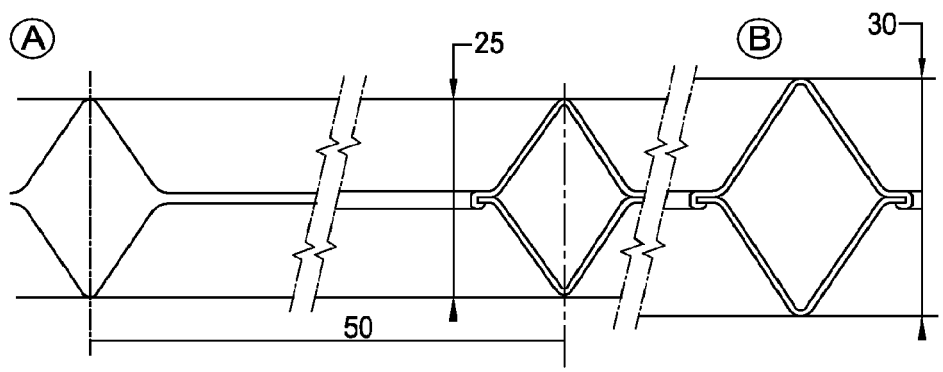
FIG. 8D shows how the strength of the structural element can be altered.
Figure 8D:
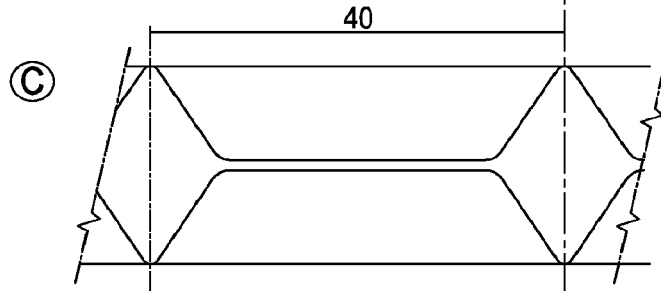
Figure 8E:
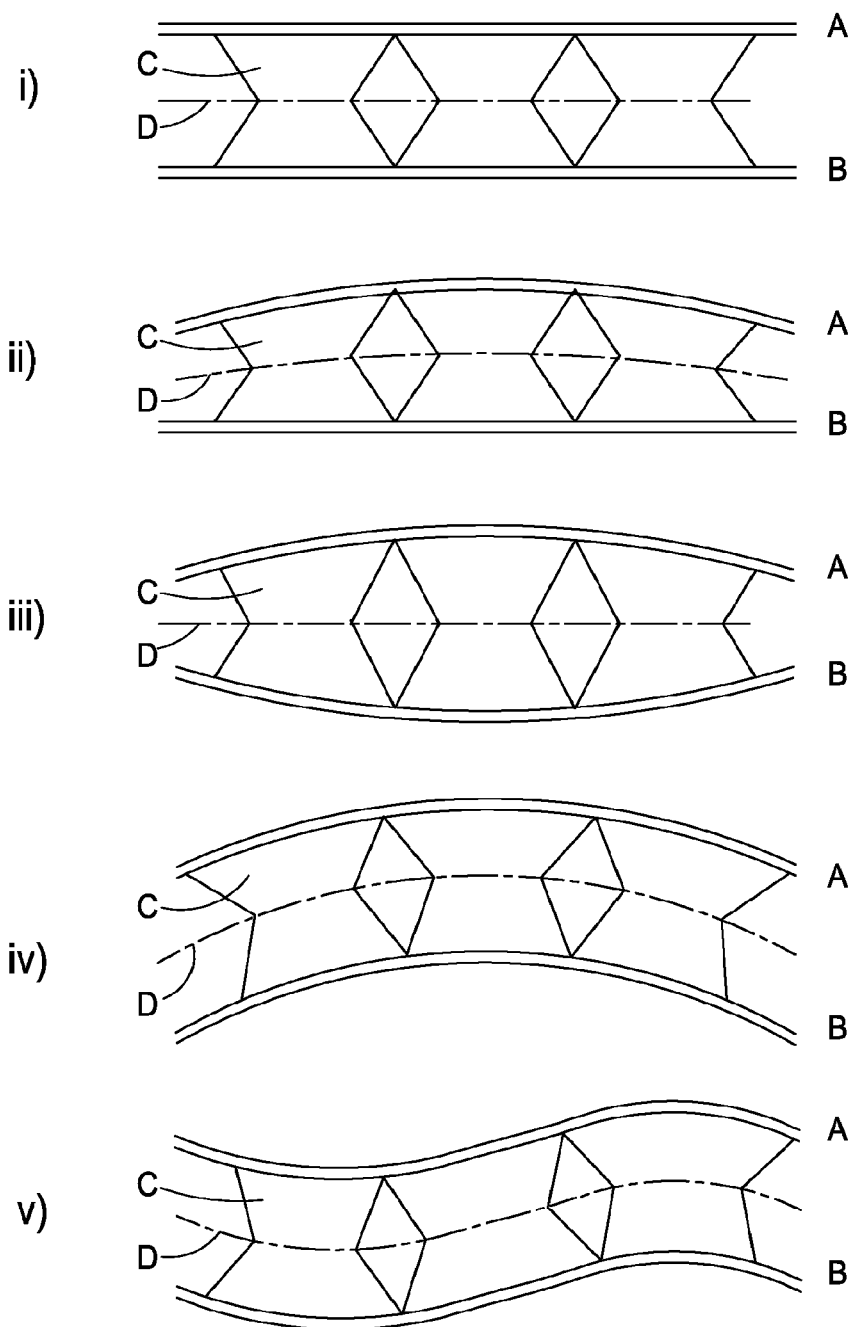
FIG. 8E shows how the shape of the panel may be other than flat.

The variation in cone size or depth can allow the structural element to be altered for various situations where dimensions or strengths are required. For example, where a sheet material 70 with a thickness 72 of 0.2 mm to 0.4 mm is used, the stiffness of the structural element 10 can be enhanced by increasing the plane distance 74 from 25 mm to 30 mm, or by reducing the diameter of the circular hole 18 (the directrix 76) from 50 mm to 40 mm. See FIG. 8D. Having the beams closer together or deepening them makes them typically more resistant to bending.

Figure 9A:
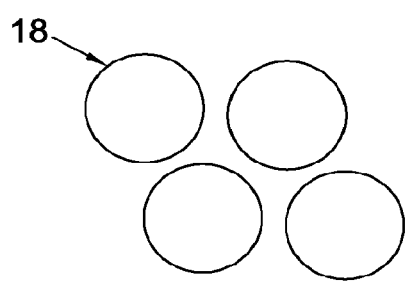
FIGS. 9A to 9H show plan view schematics of various potential arrangements for the pods in a sheet of material used to form a structural element of the present invention. Other arrangements are also possible.
Figure 9B:
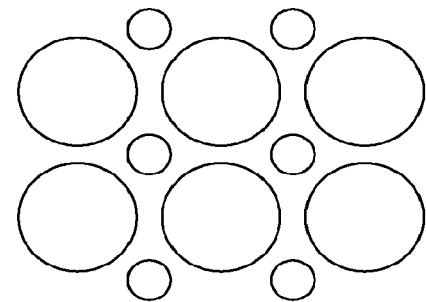

Other ways to change the strength of the structural element 10 may include varying the distance apart of the cones along the plane of the structural element, such that the diamond beam 30 has a more or less truncated apex. The cone 16, which has been described so far as a circular cone, can alternatively be changed to a different array of shapes. For example, see FIGS. 9A to 9H, which show various arrangements for the holes in the plane, and therefore various punched shapes for forming the pods in the sheet material. The first circular embodiment is shown in FIG. 9A, where circular holes 18 are arranged in offset rows. Other examples include various sized holes, triangular holes, square holes, hexagonal holes, elliptical holes, a combination of different shaped holes or indeed any number of polygons in any arrangement.

Where the holes are formed out of the sheet, the shape of the hole may have limits in terms of the degree of stretch available from the original sheet material.

The shape of the hole will help to determine what shape pod will be formed. For instance, as previously described, the circular holes 18 of FIG. 9A or FIG. 9B will typically form regular cone shaped pods.

There may be a need to add webbing or corrugations between adjacent pods to some formed shapes to increase the strength of the pod.

Figure 9C:
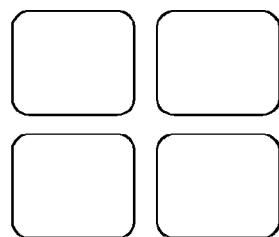
Figure 9D:
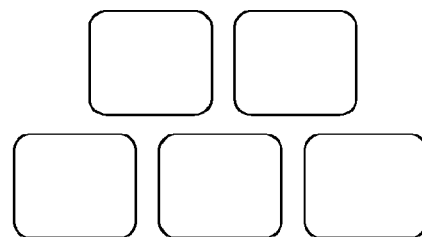
Figure 9E:
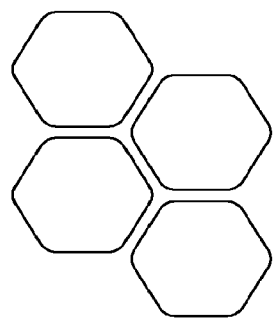
Figure 9F:
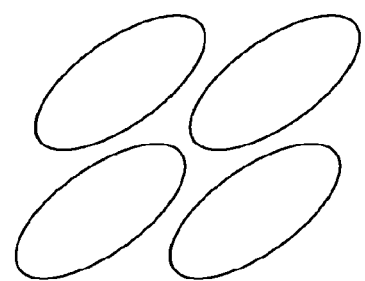
Figure 9G:
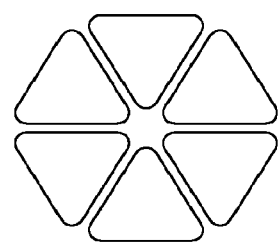
Figure 9H:
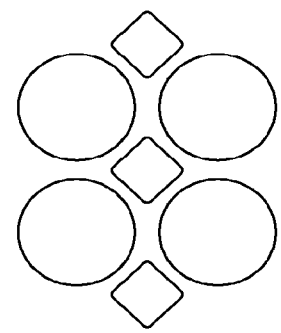
Figure 10:
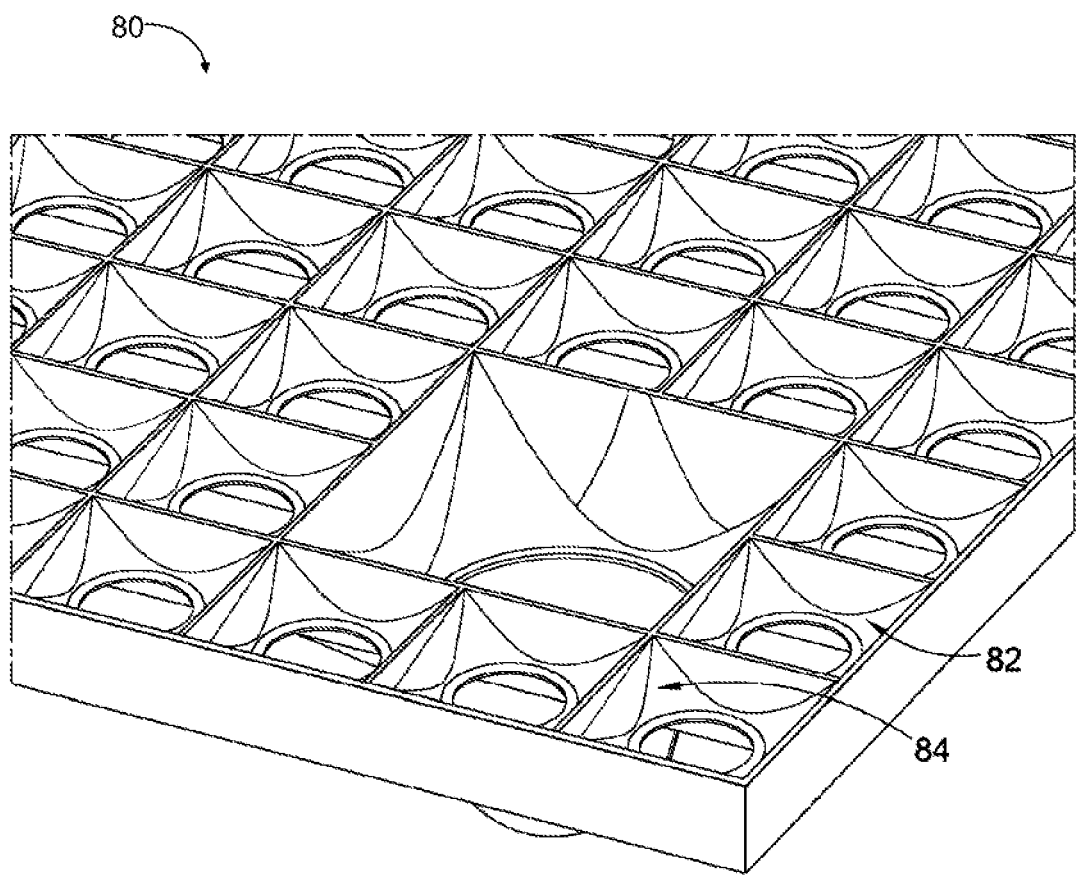
FIG. 10 shows a perspective view of part of an alternative structural element according to the present invention.
Figure 11:
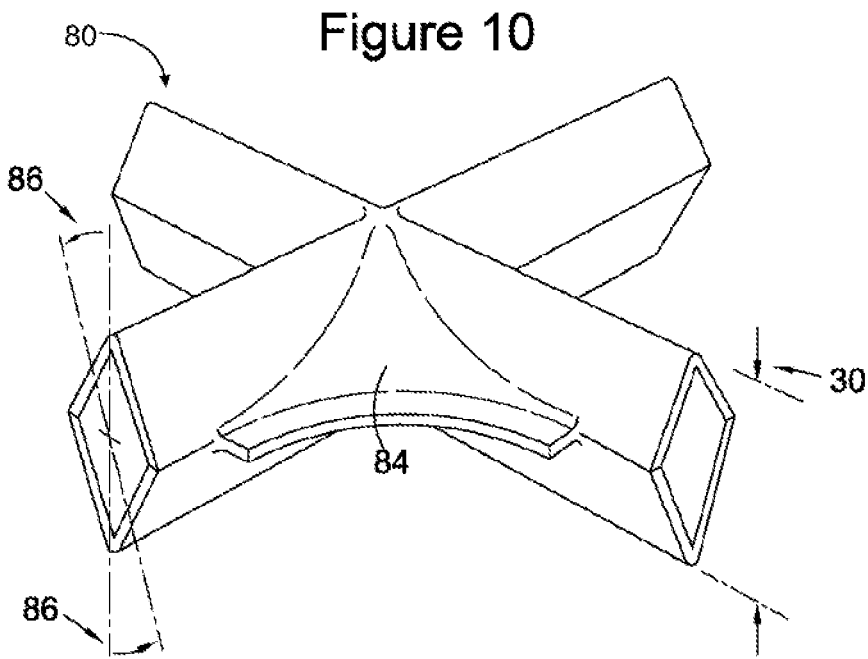
FIG. 11 shows a schematic perspective view of a cross-webbing in an embodiment of a structural element according to the present invention.

FIGS. 10 and 11 show an alternative embodiment of the structural element 80 according to the present invention. In this alternative structural element 80, the pods are similar to that as shown in FIG. 9C. Here the pods are square pods 82 and they are arranged in parallel rows and columns. Such an arrangement results in the diamond beam 30 being of a generally uniform sectional shape along the edge of each individual square pod 82. This arrangement results in the forces being more similar to that of a space frame, since between the intersections, the diamond beams are uniform for the transmittal of forces.

In this embodiment, webbing 84 has been formed at the corners of the square pods 82, this is helpful to increase the resilience of the structural element 80 to the twisting forces 86 which it may be subjected to. It also allows a deeper form for the pods since less stretching becomes necessary at the corners of the pods. FIG. 11 illustrates this webbing. It can be formed as the pod is formed (the cut-back flanges are only cut back for illustrative purposes)—or it can be fitted after the pods are formed as a post-form attachment. The former is preferred due to the reduced component count and improved ease of manufacture.

FIG. 10 also shows within the grid of pods an area with a larger pod. This larger pod occupies the space of four normal pods (although it can be smaller or larger if preferred). By occupying a space equivalent to a whole number of normal pods, it can readily be formed without altering the structure of the surrounding pods.

The larger pod is for forming or receiving a leg of the structural element, thus allowing the integral formation of legs at the underside of the structural element, e.g. to offer the structural element in the form of a pallet. The legs can support the rest of the structural element above the ground.

To form the leg, the upper sheet is deformed with a large pod, whereas the lower sheet is deformed in an opposite direction to its normal with the deformed upper larger pod still engaging a part of the pod underneath it (the oppositely extending pod of the lower sheet). These two pods thus then form a strong leg for the pallet. For or more of these might be provided in a structural element if it is to be a pallet—each being at or near corners of the structural element.

Figure 12:
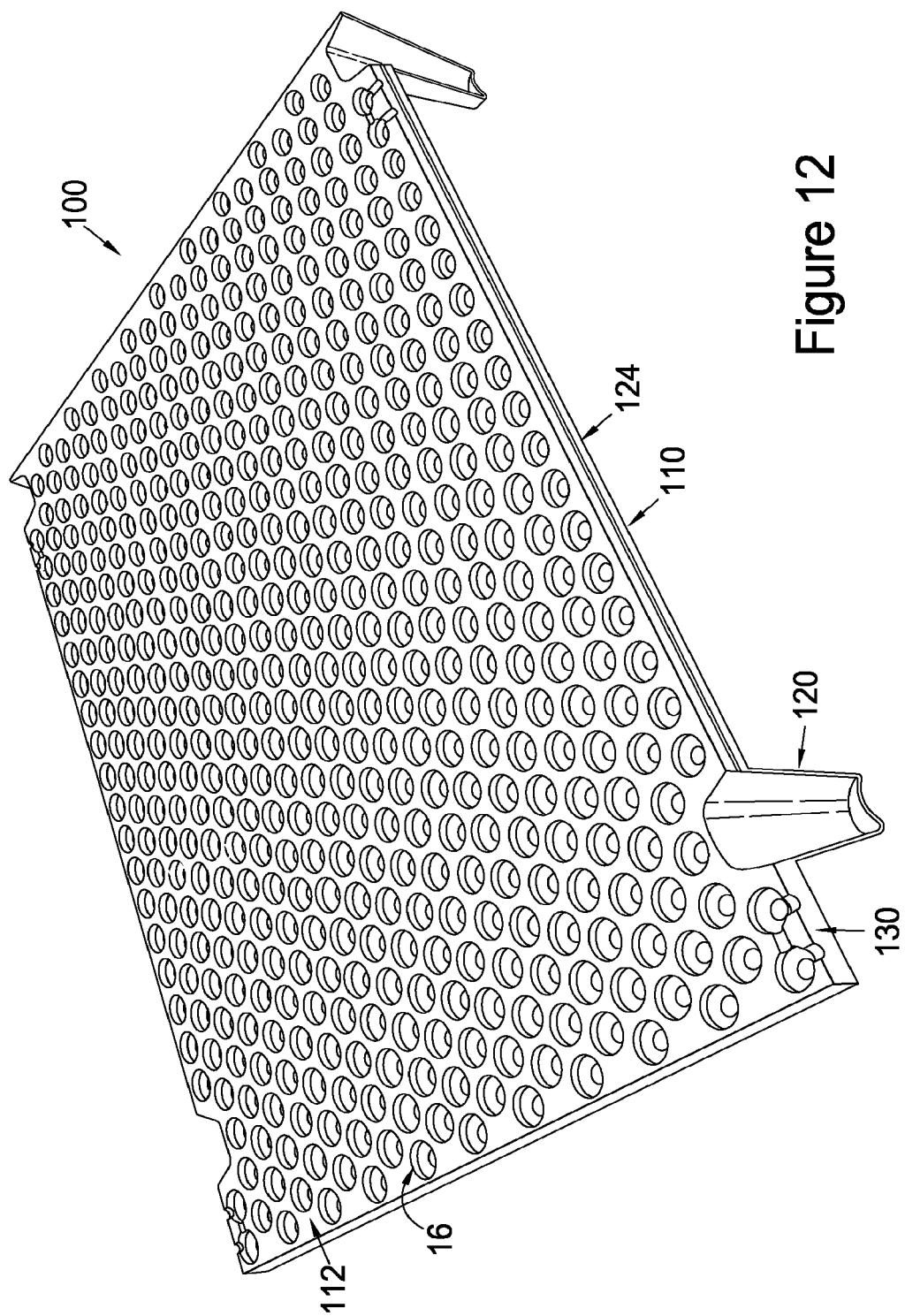
FIG. 12 shows a perspective view of a pallet incorporating a structural element according to the present invention.

FIG. 12 shows an alternative design of pallet 100 which is formed from a panel 119 utilising the pod structure of the present invention—similar to the structural element 10 as seen in FIG. 1. The pallet comprises a panel 110 which is an enclosed structural element with panel edges 124. The panel 110 can accept objects or loads on its upper face 112, which is in this example the upper plane 12 of the structural element 10. In the panel 110 are the cones 16 which pass through a half thickness of the panel 110 to mate against corresponding cones extending upwards from the lower plane.

Pallets of this type can be used for the transportation of objects, since it allows easy movement with a fork lift truck due to the elevated platform and space underneath for forks thereof. They are also typically provided as a uniform or standardised dimension product, such that load location requirements can be predetermined. This also makes them very useful in stores and warehouses and transport vehicles, where shelves/load-bays can be designed to fit or receive a pallet.

Raising the panel 110 off the ground are legs 120. These legs 120 are shaped differently to the full cup shape of FIG.

10, and instead are half-cup shapes—similar to a cup which has been sectioned in half vertically, revealing open edges.

The legs 120 are aligned to the load-bearing surface of the pallet (the structural element part, or the panel) such that the top of the cup shape is flush with the upper face 112 of the panel 110 and the open edges of the cup are flush with the lower panel edge 124. This means that the legs 120 sit inside the periphery of the panel 110. The sides of the pallet thus have recesses in them—at the legs.

Forming the base of the legs 120 is the bottom of the cup which has a generally semi-circular shape in plan. It also bends upwards to be a concave base when viewed from below, it thus extending upwards slightly inside the cup of the leg 120. This reduces the load area on the ground and also cooperates with a detail in the upper surface of a second identical pallet, as explained below.

There are four such legs in this example, although more legs can be provided if desired.

The tops of the legs 120 are wider than the bases of the legs 120. As such the sides of the legs are tapered. The legs 120 as shown also do not intersect any of the cones 16, but instead, where the leg 120 would interfere with the cones 16, the cones 16 have been omitted from the panel 110.

The profile of the leg 120 which extends through the panel in this example is generally curved, much like a semi-circle, as with the bottom of the cup, but here it is optionally more pronounced to approximate a three sided polygon with rounded edges. However any shape may be used when forming the cup shaped legs 120—for the top or bottom of the leg, and in-between, although a smooth taper from top to bottom is preferred.

Figure 13:
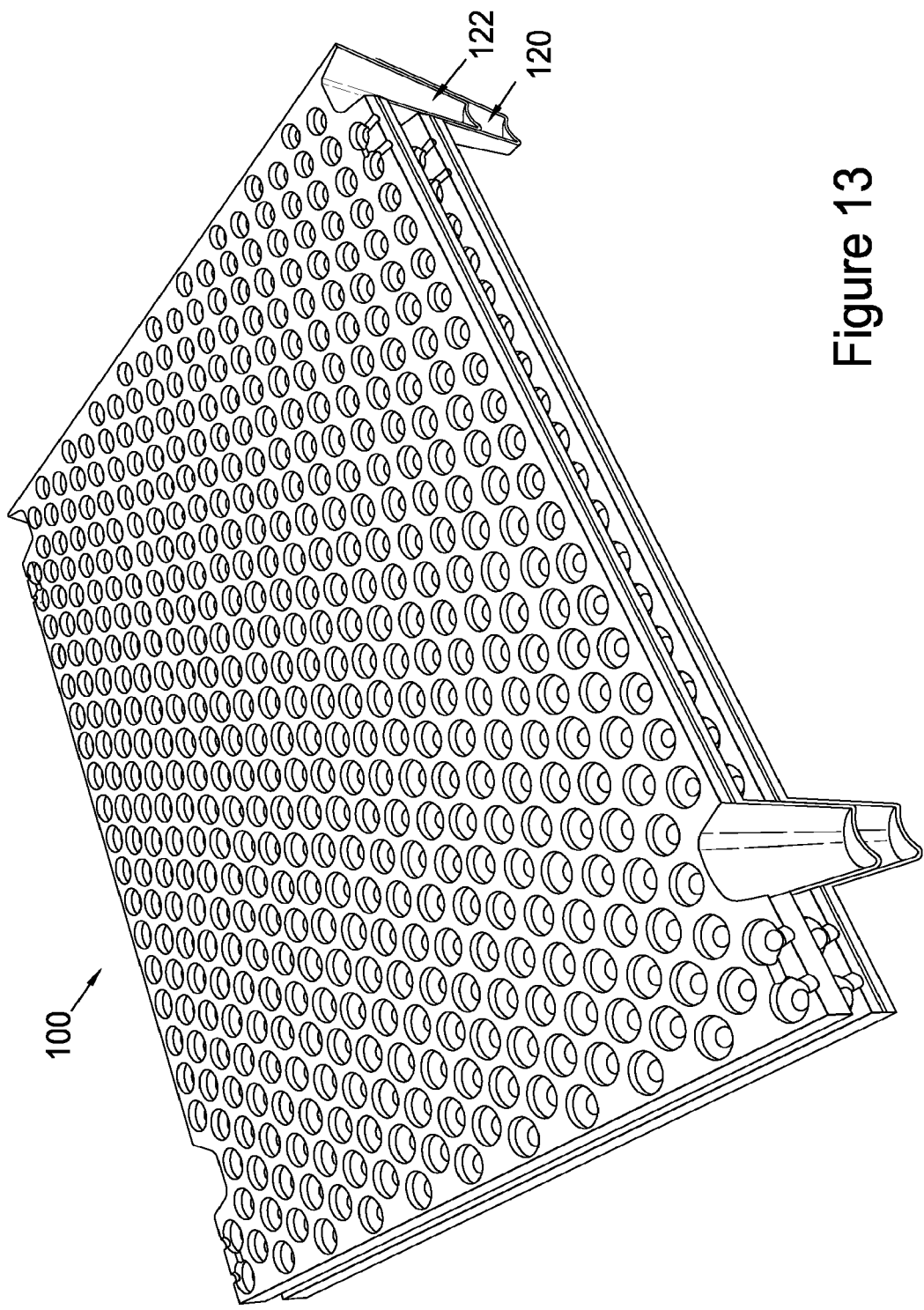
FIG. 13 shows a perspective view of two pallets of FIG. 12 arranged such that they are nesting.

FIG. 13 shows two pallets 100 which are stacked on top of one another. The pallets 100 are arranged such that the legs 120 are aligned when viewed from a plan view. Since the legs 120 are shaped as half cups with no top, and the sides of the legs 120 are angled such that they are tapered toward the base, with the preferred smooth taper, the legs 120 of a lower pallet 100 allow the adjacent legs 120 of a pallet 100 above it to partially sit inside it. This allows the pallets to nest when stacked, and each additional pallet 100 added to the stack will nest in the pallet below it.

Nesting allows pallets to be stacked, particularly when they are not in use, and occupy less space vertically than two un-nested pallets. This can be useful for the transportation of the pallets, or for their storage, allowing more pallets to be placed in a single space.

The nesting also reduces horizontal movement or sliding of stacked pallets relative to one another since they are horizontally constrained between each other.

The degree of nesting can be determined by the shape of the legs. Changing the shape or adding a ridge thereon can stop one leg from slotting further inside another.

The legs can be shaped such that a panel 110 of a pallet 100 sits directly on top of a panel 110 of the pallet below it. This can be of some use when needing to reduce space occupied by stacked pallets and it will also allow for the transfer of forces between structural element panels 110—if a greater load bearing capacity of panel was required. More common, however, is a requirement to maintain a larger gap between two stacked panels, perhaps to ensure that forks are able to fit between nested panels, or otherwise to allow their simple separation. After all, it is likely to be useful if pallets do not become difficult to un-nest from one another.

Figure 14A:
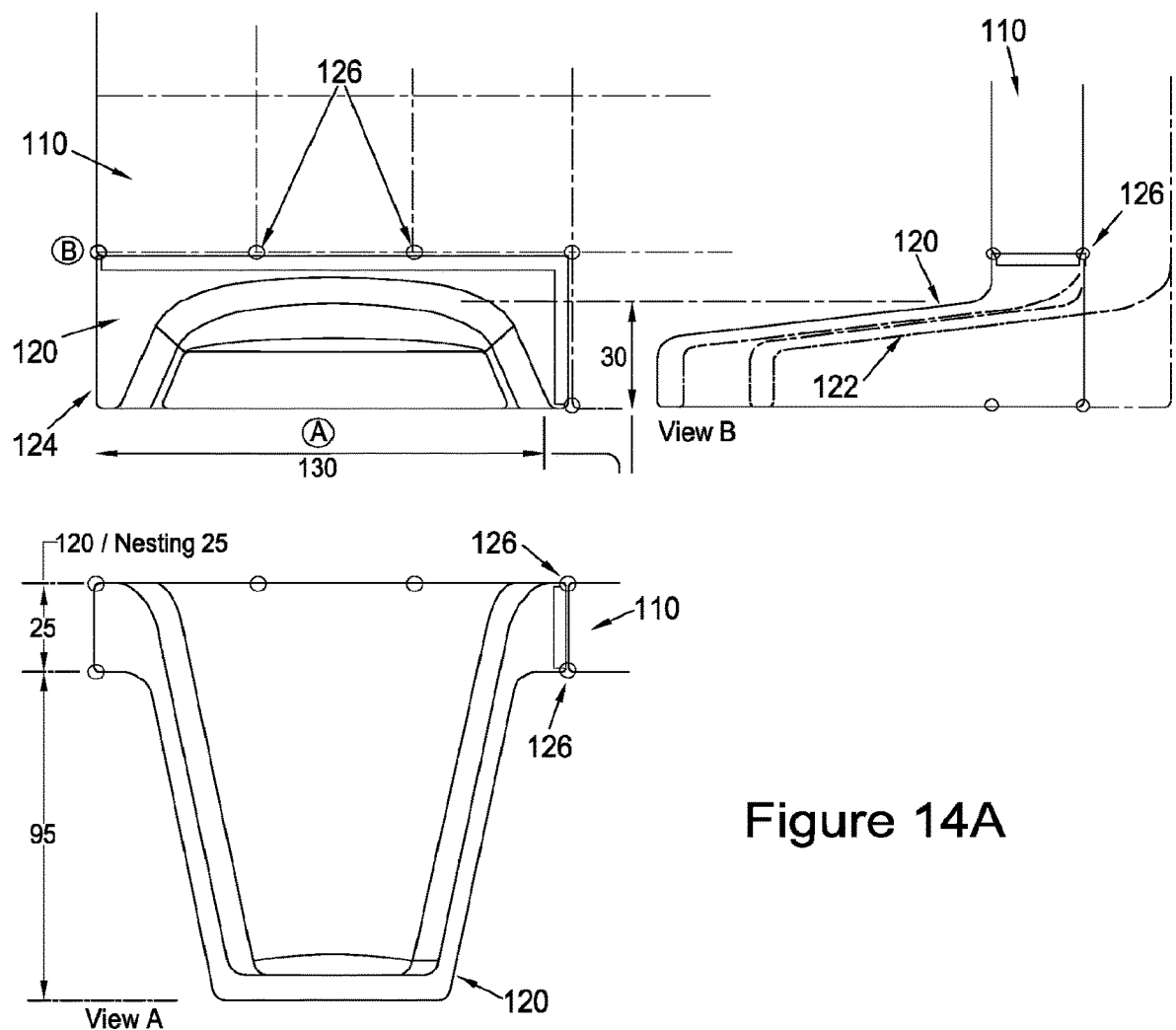
FIG. 14A shows an engineering drawing of legs of a pallet similar to that shown in FIGS. 12 and 13.

FIG. 14A shows in more detail an arrangement for a leg 120 and the nesting of an adjacent leg 122 which sits within the tapered inside surface of the leg 120. In this arrangement, the adjacent leg 122 in nested fully such that the panels 110 are in contact. It is also shown that the top of the leg 120 can sit within a larger fitting panel 124 than the top profile of the leg in FIG. 13—three pods wide, not two.

Figure 14B:
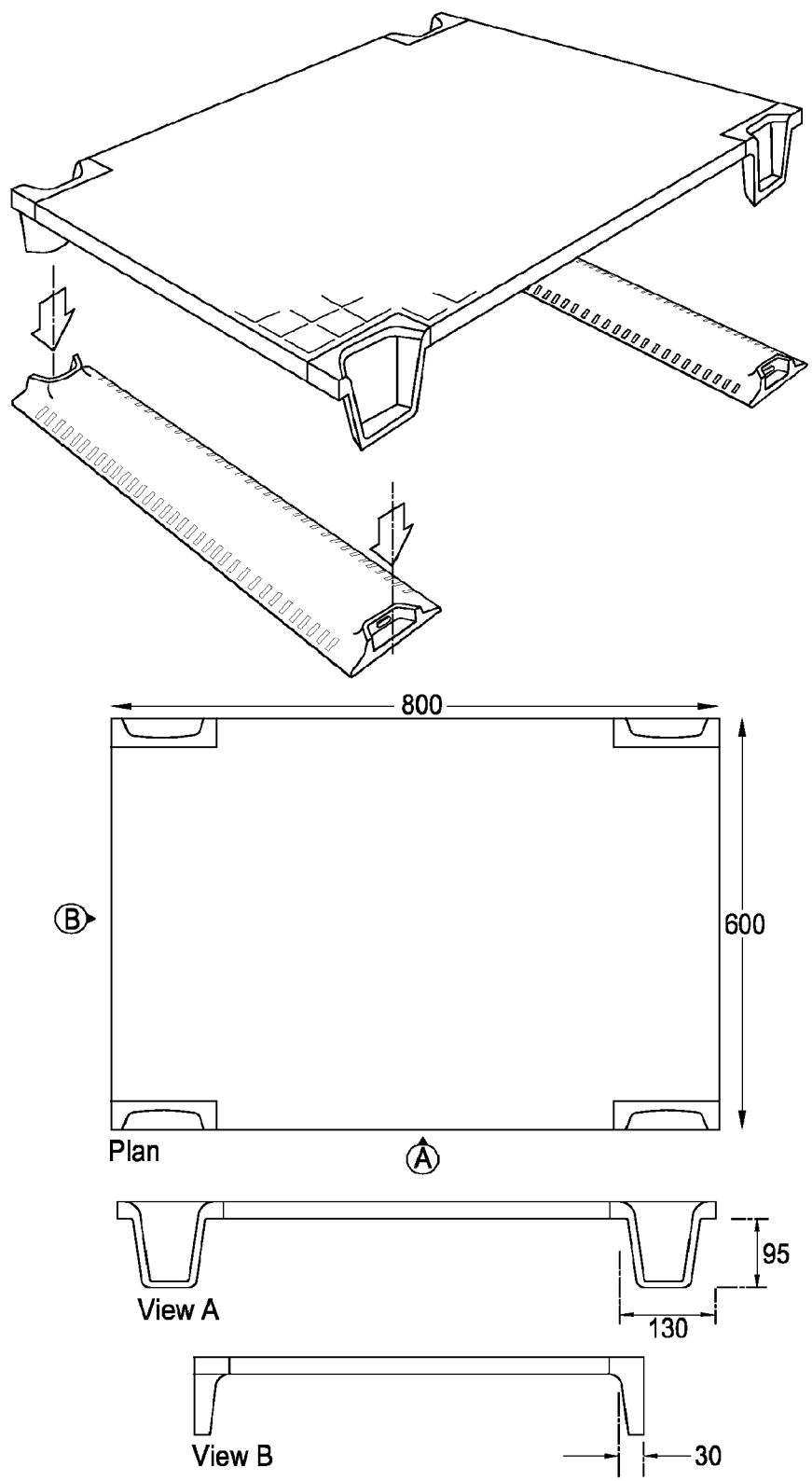
FIG. 14B shows the leg on a pallet, with removable skids.

The leg 120 may be separately moulded and then joined to the overall frame 110 by welding, brazing or other known techniques. Alternatively it can be of a design that can be pressed out of the sheets, as with FIG. 10. An arrangement where it is positioned in the corner of a pallet is shown in FIG. 14B. As can be seen there are four such legs, each in a sidewall/corner of the pallet. The pallet has square pods in its top panel rather than round ones. Additionally, the bottoms of the legs can connect with skids.

The forces which are exerted on the leg 120 can be transferred to the structural element of the panel through nodes 126, which are the apices of diamond beams within the panel 110. Therefore there is an efficient transfer of forces through the legs 120 into the structural element.

Figure 15:
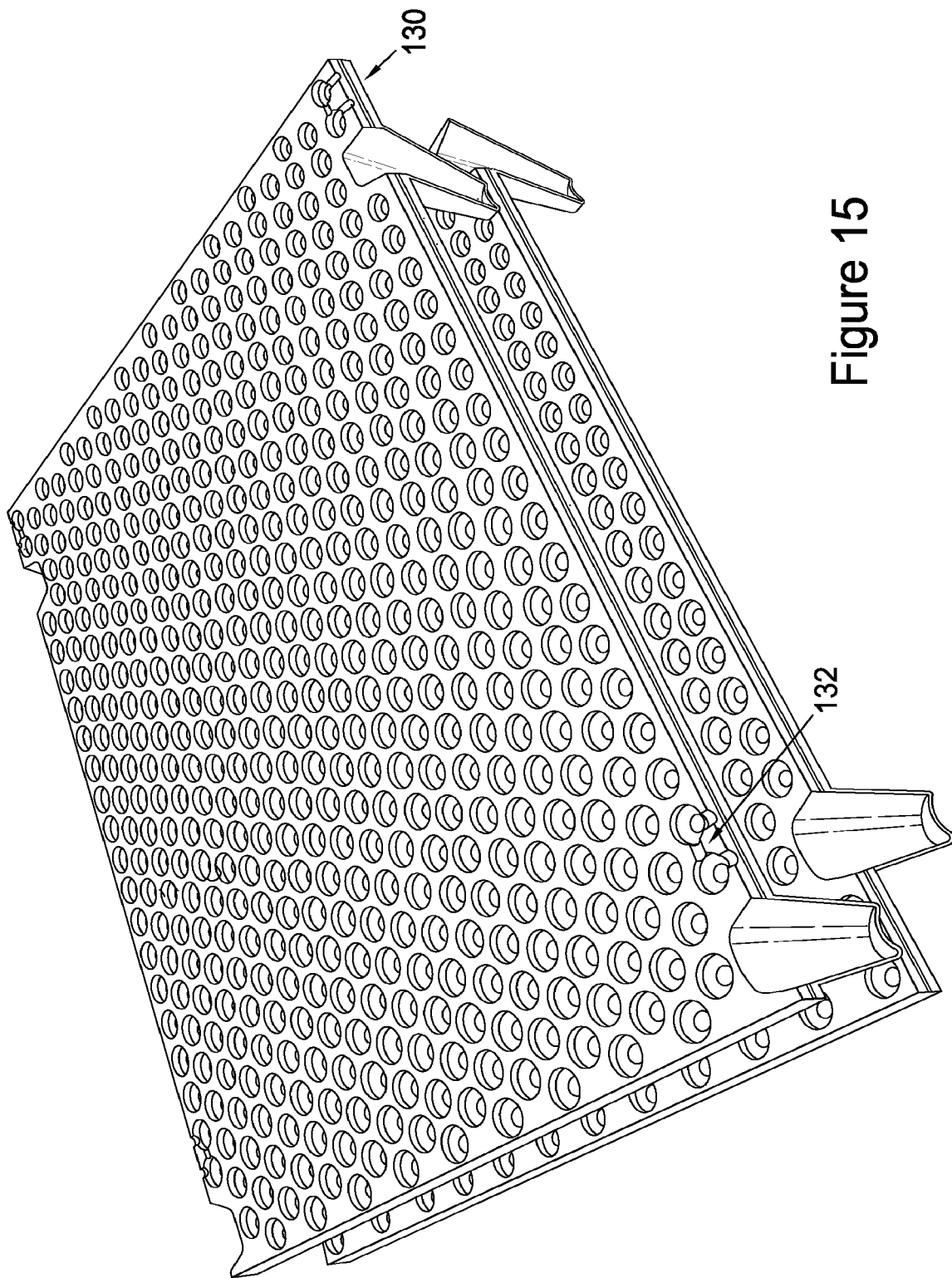
FIG. 15 shows a perspective view of two pallets of FIG. 12 arranged such that they are stacked, and only partially nested due to grooves in the surfaces of the structural element.

The legs 120 of the pallet 100 shown in FIGS. 12 and 13 do not all sit at the four outermost corners of the panel 110, but instead two of the legs are inset from this edge, resulting in an overhang 130 on one edge of the pallet, and the others are at an end, but located on a side, rather than symmetrically at the corner. Other positions are possible. However, FIG. 15 shows that due to the overhang 130 and inset legs, when two pallets 100 are stacked with the overhang 130 at opposite edges, if the panel edges 124 of the two pallets are kept vertically in-line from a plan view, the pallets 100 may stack without full nesting. Further pallets can be stacked in this manner, and since the overhang 130 alternates sides, this mode of stacking maintains a straight stack since the centre of gravity is not eccentric over lower stacked pallets.

Such stacking without nesting may be useful when objects shorter than the legs are loaded onto the pallets, or when a small number of the pallets are to be stored or moved—the gaps between the panels readily receive forks of a forklift.

An additional feature of the pallet 100 that is useful when stacking pallets without full nesting, is the groove—here a semi-circular circular groove 132—present adjacent to the top of the legs on the upper face 112 of the pallet 100. There are four of them—one by each leg top. The circular groove 132, in each case, is an indentation in the top sheet shaped such that the base of the legs 120 (with its concave detail) can locate within the circular groove. This allows, when stacking, a guide to ensure the legs 120 are located in the ideal location to ensure the maximum stability for the stacked pallet structure. Further, since the pallet may be formed of a rigid material with a smooth surface (e.g. a metal), there may be an increased tendency for pallets to slide when stacked or nudged. The circular grooves 132 have the added feature of reducing sideways movement of the pallet 100 since they add an additional vertical movement necessary for any sideways movement, and since they are not linear, they encapsulate the leg bases.

Although a circular groove is shown, any shape which relates to the base of the leg of the pallet may be used. In particular, other shapes are possible which will provide stability.

The encapsulation function is also beneficial—i.e. for the prevention of slippage through some or all grooves simultaneously. This may be achieved with blind slots, angular slots, or differently orientated grooves at the respective leg positions around the surface of the pallet. In the present example, this already occurs since the semi-circles face opposite direction on opposite sides of the pallet.

Alternatively a rough surface may be applied at the points of contact to reduce the tendency for horizontal relative movement.

Figure 16:
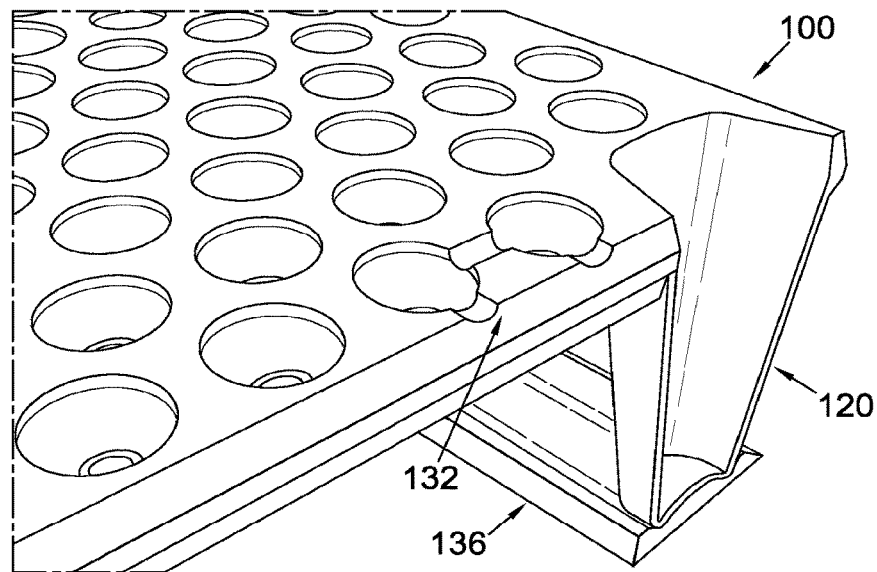
FIG. 16 shows a detailed view of the leg of a pallet of FIG. 12, plus some grooves for receiving a bottom of a leg of a further pallet.

The present invention can also comprise such a pallet fitted with separate skids. Many conventional pallets have skids to form the bases. For example, see the arrangement as shown in FIG. 16. This skid plate 136 extends between two legs 120 and has a groove similar to that of the circular groove 132 for locating the leg 120 onto the skid plate 136. The leg 120 may then be attached to the skid plate 136 by joining methods such as welding. Other leg base and groove designs are naturally possible, as discussed above for the grooves in the upper surface of the plate.

The skid plate 136 allows the pallet 100 to be used in situations where legs 120 may cause a point load and damage the surface on which they are stood, or where legs 120 would be impractical, for instance on a conveyer belt of a factory where pallets may have goods loaded directly onto them. The use of a skid plate 126 also allows the pallets 100 to be manufactured with just legs 120 and the skid plates 136 added afterwards, thus removing the need for two pallet manufacturing processes. The skid plates 136 can also be of a different material to the pallet 100, or have a softer material bonded to their underside, this may be useful where a harder material of a pallet may damage a surface, but a soft base, such as wood, can reduce the likelihood of scratches on floors due to pallets being slid about.

Figure 17:
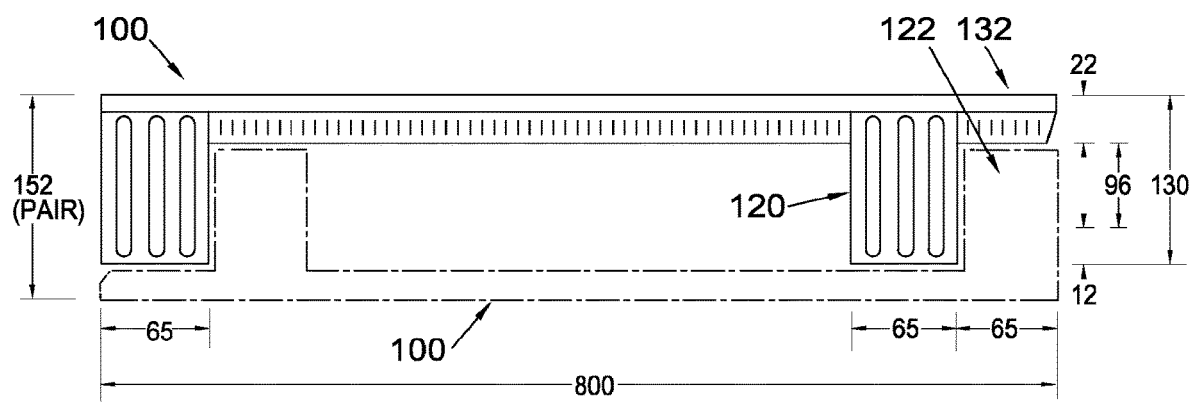
FIG. 17 shows a side view of an alternative embodiment of pallet nested in an alternative arrangement to FIG. 13 to a ghosted second pallet.

The skid plate 136 would mean that nesting of the pallet was no longer possible, however, FIG. 17 shows an alternative arrangement for nesting pallets which could apply when a skid plate 136 is installed. Here, due to the overlap 132, a pallet 100 can be inverted relative to another pallet so that the legs 120 sit next to the adjacent legs 122 of the other pallet. This can provide the same reduction in height when nesting two pallets as the legs 120 without the skid plates 136. In addition grooves can be present on the underside of the panel 110 for locating the legs 120 or skid plates 136 when inverted nesting the pallets. This mode of nesting can likewise be used without the skid plates.

Figure 22:
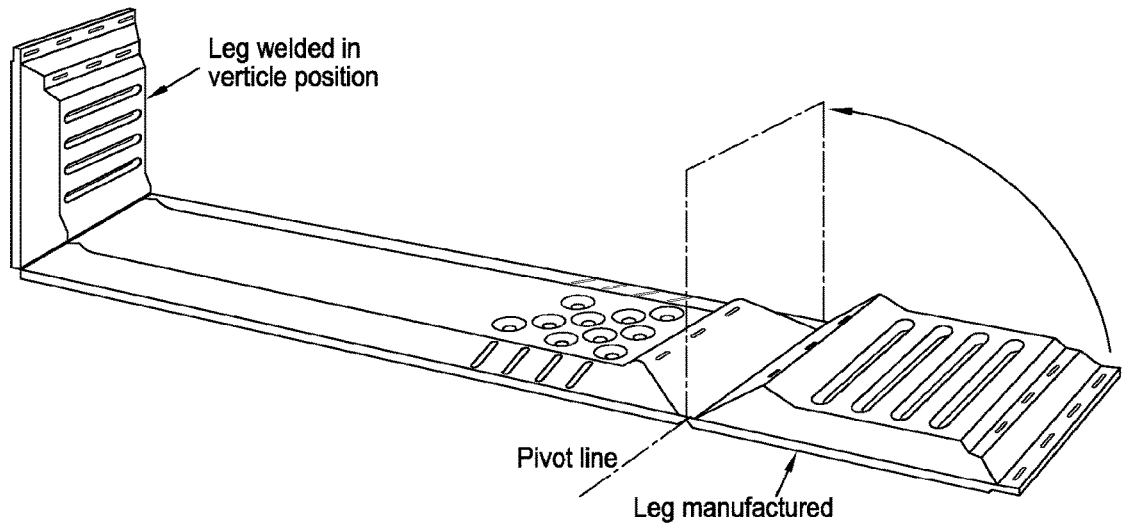
FIGS. 22 to 24 show a further use—in the skids.
Figure 23:
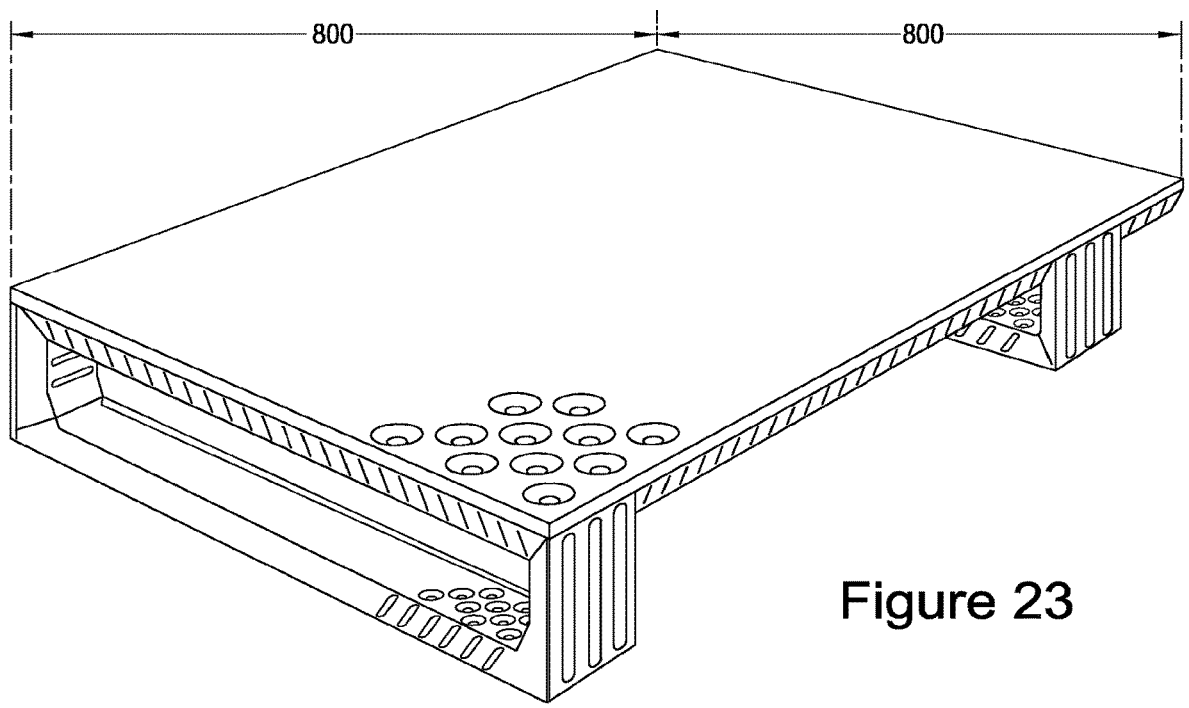
Figure 24:
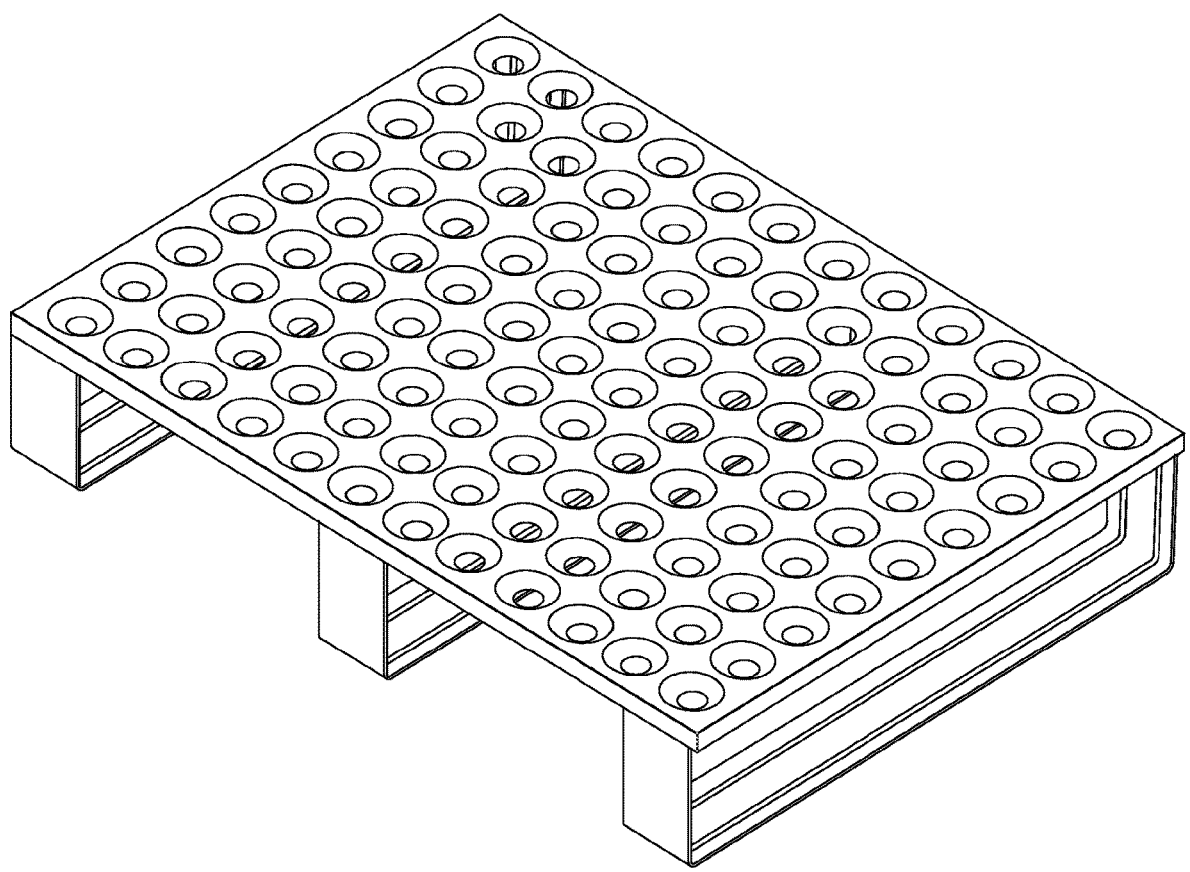

The present invention may even reside in the design of a skid plate 136, See FIGS. 22 to 24. After all, the elongate skid member may be formed as a structural element using the pods structure, it thus being a structural element according to the present invention. As shown in FIG. 22, the skid can be formed with more than one section of structural element, here attached to one another along a foldable lower sheet member. The sides are angled and through folding and welding of the structural members together, the U shaped skid can be formed. This can then be attached to a pallet top, such as one that is in accordance with the present invention as shown in FIG. 23.

FIG. 23 shows two skids on the pallet, one being recessed from an end to leave an overhang, as previously discussed. FIG. 24 instead shows three skids—two end skids and a middle skid. Other arrangements are also within the scope of the invention. FIG. 24 also shows the pods in a non-staggered, grid-like array. This is another option for the circular holes 18.

Figure 18:
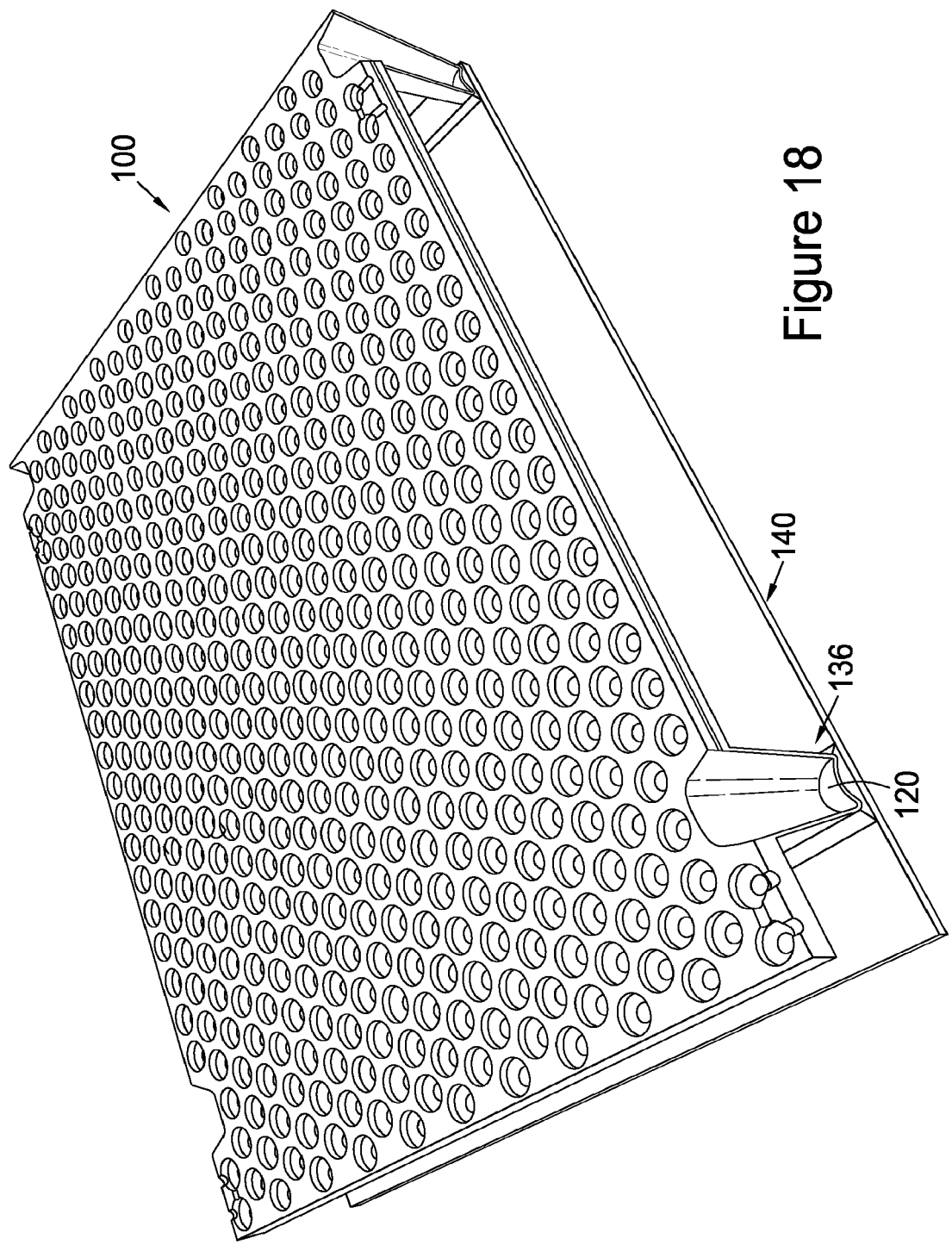
FIG. 18 shows a perspective view of the pallet of FIG. 12 stood on a base plate.

Due to the advantages afforded by the legs 120 with and without the skid plates 136, it may be desirable to have a pallet which has the benefit of both. FIG. 18 shows a base plate 140. This base plate either has skid plates 136 mounted to it, so a pallet can be put onto the skid plates, or it receives a pallet with such skid plates on it. It may even be provided without skid plates between the pallet and the base plate— the base plate thus then having, preferably, the above-described groove feature for directly receiving a pallet with legs. This allows the pallet 100 to be placed on the base plate 140 and the base of the feet 120 be secured thereon by the grooves in the skid plates or in the base plate 136.

The base plate 140 may be used on production lines with conveyer belts and allow the pallets to move along without risk of the legs 120 lacking the surface area to be sufficiently carried by the conveyer belt.

The pallets can be manufactured from two sheets of material which are punched to form the necessary shape and removing the space for the legs 120. This can be one pressing motion with a continuous sheet of material being passed through the machine and cut up later into panel 110 sized blocks. The pressed sheet is then joined to an opposing pressed sheet at the cone bases.

The legs 120 can even be extruded from the sheets of material, although if thicker material is required to provide strength, or if a greater form height than that which would be safely achievable from the sheets is required, then a separate joining method will be preferable for the legs.

Many materials can be used for forming the pallets 100, although metal sheet materials particularly suit the process. Metals also have the added benefit of being easily cleaned and sterilized. This can be important when transporting goods on pallets to countries where there are strict laws about imports, such as those where wooden pallets would be prohibited due the possibility of carrying insects or foreign matter, or in general for food stuffs. Stainless steel, aluminium and plastics may be useful materials in that respect due to their sterilisability, and thus reusability. However, many other materials are also reusable or recyclable—of benefit in other sectors.

The weight of a pallet can also be important, and the sheet material offers the ability to produce a pallet of great strength with minimal weight. The cones 16, with the centres removed also reduce the weight of the pallet. For example, whereas a conventional wooden pallet may weigh about 10 kg (for a typical 600×800 pallet), an equivalent pallet of the present invention, made of 0.24 mm steel, taken off coils of sheet steel and pressed to the required shape with the pods as shown in FIG. 12, which pallet will offer a similar safe working load capacity to that of the prior art timber one, may weigh only 1.8 kg.

It is preferred that for a 1200×800 pallet, the weight of the pallet, when utilising the present invention, does not exceed 4.0 kg.

The thickness of the sheets of steel preferably do not exceed 1 mm, but more typically will not need to exceed 0.4 mm or even 0.3 mm. 0.24 mm has been found to be adequate for standard pallet sizes.

In terms of the thickness of the panels, where the sheets are made of mild steel, a sheet having a thickness of 0.25 mm can theoretically be stretched safely to provide a panel having a depth of about 40 mm. It is preferred that the pods from such sheet material do not exceed a depth of 25 mm. In general this equates to a preferred pod height not exceeding 10× the thickness of the sheet material.

The cones 16 in the pallet 100 also have a number of other features. They allow the circulation of air around the object on the pallet, this can be important when consignments must be heated or cooled to certain temperatures before travelling. This is commonly useful in the logistics industry, especially in the cold chain where the speed of bringing consignments down to the desired temperature affects operating costs and consignment quality. With the pods of the present invention's structural element, this airflow is achieved substantially evenly across the entire panel, especially with square or other high-packing-density pod shapes such as triangles and hexagons. The cones 16 also ensure that if liquids fall onto the pallet, or they are left outside in the rain, no liquid can gather in pockets in the pallet. This can also apply to dirt, where it will be washed through the holes of the pallet, and, if necessary, can easily be cleaned by spraying water.

The cones 16 also provide an uneven surface which softer objects carried on the pallet may sink into and thus be more secure on the pallet.

It is preferred that in any design that the apex of the beams/borders of the top-surface holes 18 have a rounded edge so that it is smooth to prevent cutting, tearing or other "sharps" damage to goods stored or located on the pallets.

Figure 19:
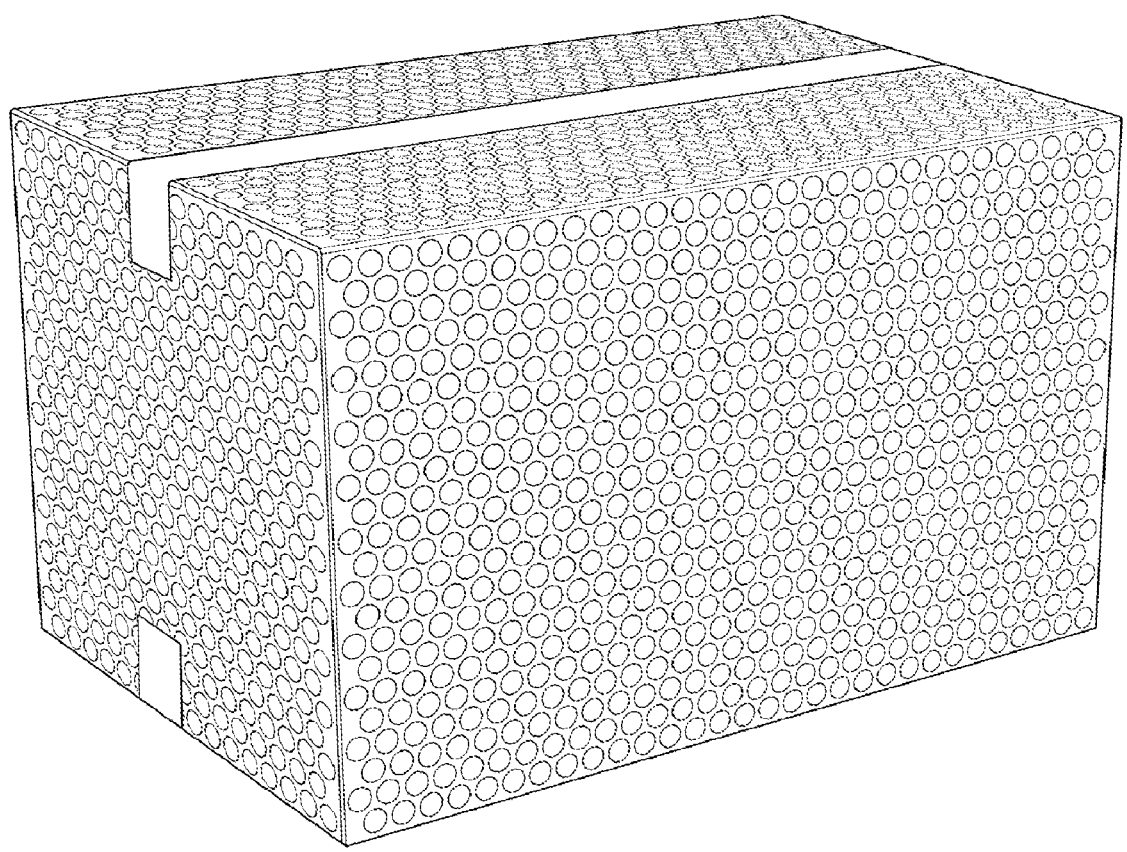
FIGS. 19 to 21 show alternative uses for a structural element according to the present invention.
Figure 20:
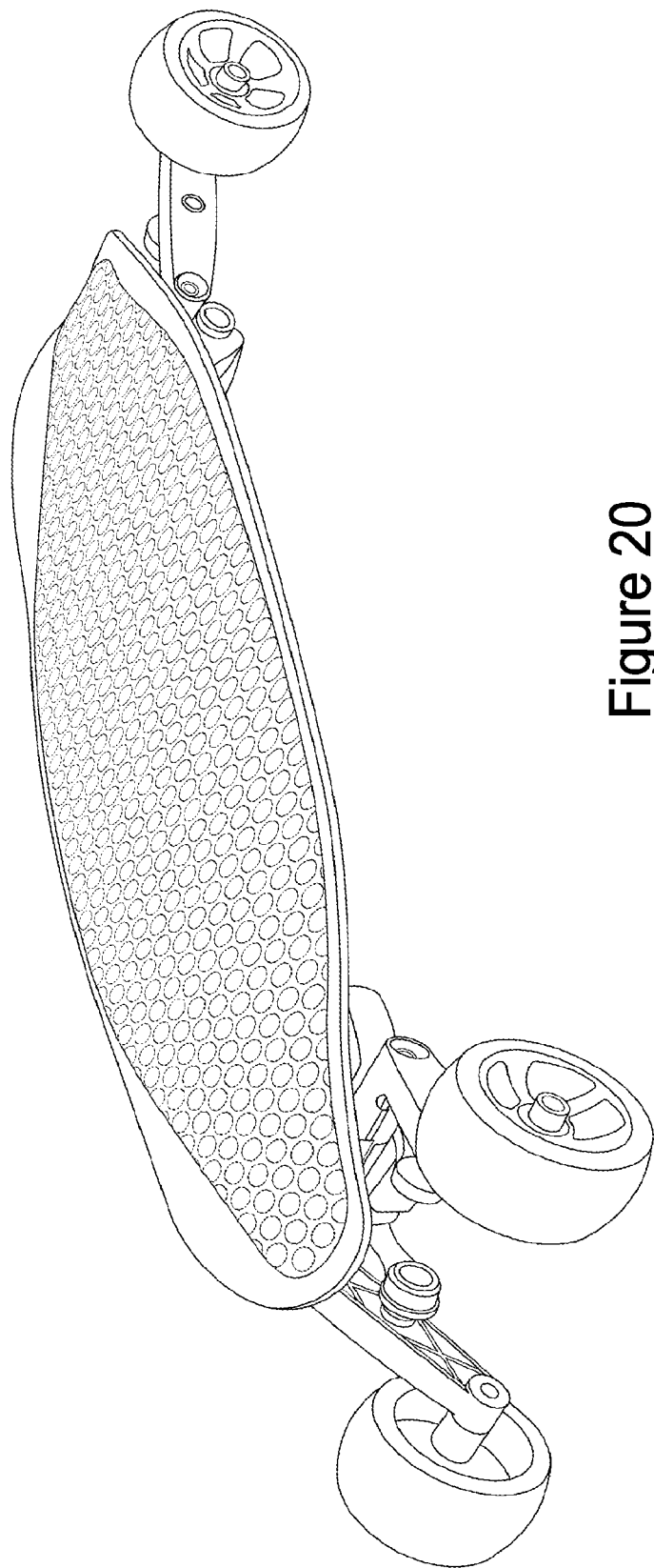
Figure 21:
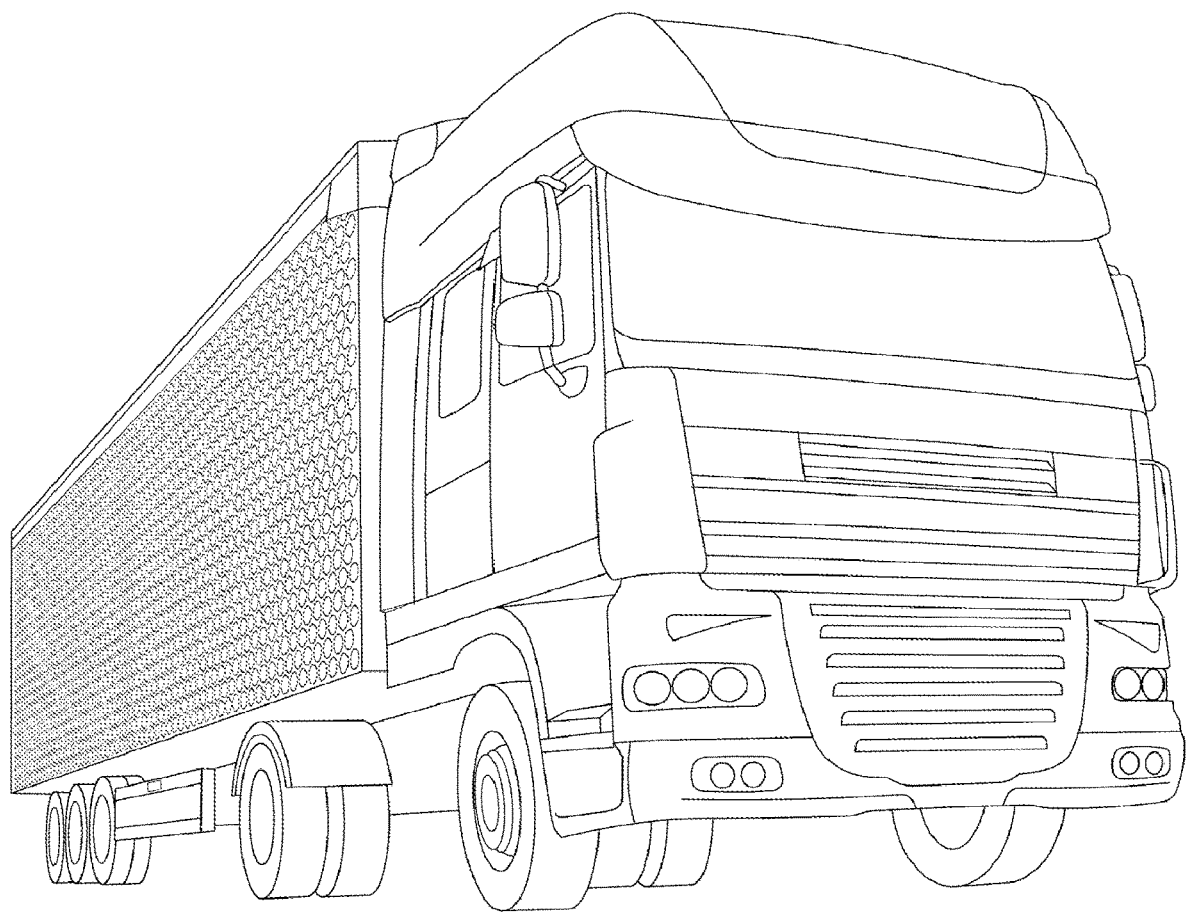

Although a specific use in pallets has been discussed, the structural element may be used in any number of further applications. FIGS. 19 to 21 gives some further examples of the use of the structural element, although the use is not limited to these.

FIG. 19 shows a box, which may be formed of cardboard or any other suitable material which has the internal structure of the structural element. This will provide additional strength to the box and may allow additional stacking of boxes, which may make transport easier and result in fewer goods damaged in delivery due to boxes being crushed.

Corrugated sheets in general can likewise benefit from the present invention's structure, e.g. using a touch adhesive on the internal faces of the two pod-formed sheets.

The structural element can includes a means of counterfeit protection. When considering card, a specific paper grade or an injected chemical signature in the pulp can be utilized. A particular or distinctive image or pattern, etc. can be printed on the inner, unseen, surfaces of the sheets to further provide some counterfeit protection.

Such techniques can provide a subtle, or difficult to reproduce signature which can be used to identify the structural element.

FIG. 20 is a skateboard where the structural element is used to form the board or platform, this uses the advantages of the structural element of the present invention to create a lightweight yet strong platform, which can reduce the weight of the skateboard.

FIG. 21 is a lorry where the trailer is formed from panels of the structural element according to the present invention. This can provide a strong side of a lorry trailer, protecting the loads inside and also, due to the shape of the cones on the surface of the panels, may reduce pressure drag past the sidewalls of the vehicle as the vehicle moves along the road. This is achieved since the pods can creating a turbulent flow on the panel's surface, thus and reducing the wake of pressure difference. This is similar to the dimples of a golf ball. For this it is preferred that the cones or pods are generally rounded, or relatively shallow, i.e. not exceeding 25% of their maximum outer diameter or maximum outer linear dimension, The present invention has therefore been described above by way of example. It provides a structural element (10) with an upper plane (12) and lower plane (14) which are parallel and deformed along their plane at intervals by pods (16) which extrude toward the opposing plane with their internal faces mating to one another.

The invention claimed is:

1. A structural panel consisting of two sheets of sheet material wherein each of the two sheets is deformed at intervals along their respective lengths and widths to provide pods that protrude from a respective plane of the respective sheet, wherein the two sheets are the outermost sheets of the structural panel, the two sheets being juxtaposed to each other in mirror-image, or facing, fashion, with the pods being inwardly oriented and floors of the pods engaging in contact zones, such that the walls of the pods in both sheets slope obliquely relatively to the plane of their respective sheet, and the pods act as interconnecting diagonal braces whereby loads on the structural panel will be transmitted along the surfaces of the pods in multiple directions and distributed throughout the structural panel, the pods in each sheet having a close proximity to one another in order to be mechanically interdependent and so that the walls of engaged pods form diamond beam formations between adjacent engaged pods such that multiple diamond beam structures are formed by the diamond beam formations in the structural panel in negative spaces immediately between pairs of engaged pods, the slope of the walls of the diamond beam formations being straight between outwardly oriented, rounded, apexes of the diamond beam formations and the floors of the inwardly oriented pods.

2. A structural panel according to claim 1, wherein a part of the floor of one or more of the pods is removed leaving an open annular flange.

3. A structural panel according to claim 1, wherein each pod has a mouth and mouth is substantially square.

4. A structural panel according to claim 3, wherein the pods occupy substantially a whole of a first of the two sheets, defining a grid where the pods meet at their upper edges.

5. A structural panel according to claim 1, wherein away from the outwardly oriented, rounded, apexes of the diamond beam formations, the pods leave spaces between the pods in the material of the plane of each sheet around the pods.

6. A structural panel according to claim 5, wherein the material of the plane of the sheets around the pods is provided with strengthening portions by the use of one of corrugations, ridges or folds.

7. A structural panel according to claim 1, wherein each pod includes a mouth, wherein the mouths of the pods are polygonal to create an elongated diamond beam structure along the walls of the engaged or joined pods.

8. The structural panel of claim 1, wherein the pods have webbing at corners of the pods.

9. A structural panel according to claim 1, wherein the depths of the pods are in the range of 7 to 20 mm.

10. A structural panel according to claim 1, wherein a side of the pods is predominantly at an angle between 30 and 80° from the plane of one of two sheets of the structural panel.

11. A structural panel according to claim 1, wherein the sheets of the structural panel are made from sheets of a fibrous or cellulose material.

12. A structural panel according to claim 1, forming a top panel of a pallet.

13. A structural panel consisting of two sheets of sheet material that are deformed at intervals along their respective lengths and widths to provide pods that protrude from respective planes of the respective sheets, wherein the two sheets are outermost sheets of the structural panel and form outermost surfaces, wherein the two sheets act as tensile and compression chords for the structural panel, with the pods comprising multiple inwardly orientated pods throughout the structural panel, the inwardly orientated pods having pod apexes that are joined together, which pods have a close proximity to one another in order to be mechanically interdependent creating a double depth space-frame lattice type matrix where loads placed on a surface of the structural panel are resisted and transferred through the chords and with the inwardly oriented pods acting as interconnecting diagonal braces such that the loads are transmitted along the surfaces of the pods in multiple directions and distributed throughout the structural panel, wherein the walls of a side cross-section of joined pods, due to the close proximity of the pods in each sheet, form diamond beam formations between adjacent joined pods such that multiple diamond beam structures are formed by the diamond beam formations in the structural panel in negative spaces immediately between pairs of joined pods, the walls of the diamond beam formations being straight between outwardly oriented, rounded, apexes of the diamond beam formations and the pod apexes of the inwardly oriented pods.

14. A structural panel according to claim 13, further comprising foam being positioned between the sheets to offer insulation or soundproofing properties.

15. A structural panel according to claim 13, wherein the structural panel is made from two sheets of a fibrous or cellulose material.

16. A structural panel according to claim 13, further comprising a specifically identifiable material or element, or a chemical signature, within the identifiable material that forms the structural panel.

17. A structural panel according to claim 13, further comprising markings or watermarks on an inner surface of each of the sheets.

18. A structural panel according to claim 13, further comprising a wireless, RFID, NFC, or electronic communication device incorporated therein to allow remote electronic identification.

19. A structural panel according to claim 13, wherein the pod has a height that does not exceed 10× the thickness of the sheet material.

20. A structural panel according to claim 13, forming a top panel of a pallet.

* * * * *